United States Patent
Soegiono

(10) Patent No.: US 9,459,794 B1
(45) Date of Patent: Oct. 4, 2016

(54) INTERACTIONS BASED ON MULTIPLE STYLUS INPUTS

(71) Applicant: Amazon Technologies, Inc., Reno, NV (US)

(72) Inventor: Orry Wijanarko Soegiono, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 276 days.

(21) Appl. No.: 14/223,202

(22) Filed: Mar. 24, 2014

(51) Int. Cl.
*G09G 5/00* (2006.01)
*G06F 3/0488* (2013.01)
*G06F 3/0481* (2013.01)
*G06F 3/01* (2006.01)

(52) U.S. Cl.
CPC ........... *G06F 3/04883* (2013.01); *G06F 3/017* (2013.01); *G06F 3/0481* (2013.01); *G06F 2203/04803* (2013.01)

(58) Field of Classification Search
CPC .. G06F 3/033; G06F 3/0484; G06F 3/04883; G06F 3/0481; G06F 3/04817; G06F 2203/04803
USPC ................. 345/156, 157, 173, 179; 715/863
See application file for complete search history.

(56) References Cited

U.S. PATENT DOCUMENTS

| 2004/0119763 | A1* | 6/2004 | Mizobuchi | G06F 3/04883 715/863 |
| 2009/0058821 | A1* | 3/2009 | Chaudhri | G06F 3/04817 345/173 |
| 2010/0125787 | A1* | 5/2010 | Chihara | G06F 3/04883 715/702 |

OTHER PUBLICATIONS

"Note Taker HD Help Pages", Copyright 2012 Software Garden, Inc., retrieved on Mar. 24, 2014 at <<http://www.notetakerhd.com/help/>>, 91 pages.

* cited by examiner

*Primary Examiner* — Jennifer Nguyen
(74) *Attorney, Agent, or Firm* — Lee & Hayes, PLLC

(57) ABSTRACT

In some examples, a stylus may be used to make a first input including a first shape at a first location on a display. The first location may correspond to a location of a graphic element presented on the display, and a mark consistent with the shape may be presented on the display, such as overlying the graphic element. Additionally, the stylus may be used to make a second input including a second shape. For example, the second shape may correspond to a command for performing an operation. In response, to the entry of the first shape and the second shape, the operation may be performed on or with respect to the graphic element. In some instances, various different shapes and combinations of shapes may be mapped to various different operations, designations, destinations, and so forth.

20 Claims, 11 Drawing Sheets

INTERACTIONS BASED ON MULTIPLE STYLUS INPUTS

BACKGROUND

The recent proliferation of electronic devices, such as smart phones, tablet computing devices, electronic book (eBook) reader devices, mobile computing devices, digital media devices, and the like, has led to a huge increase in the use of touchscreen display technology. For example, touchscreen displays enable convenient user interface interaction with a device by touching a display with a finger, and without the use of peripheral input devices such as a mouse or keyboard. However, a finger does not always provide a desired level of precision for some types of inputs made to conventional touchscreen displays. Consequently, a stylus may be used to enhance the experience of a user by increasing functionality when interacting with an electronic device.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1A:
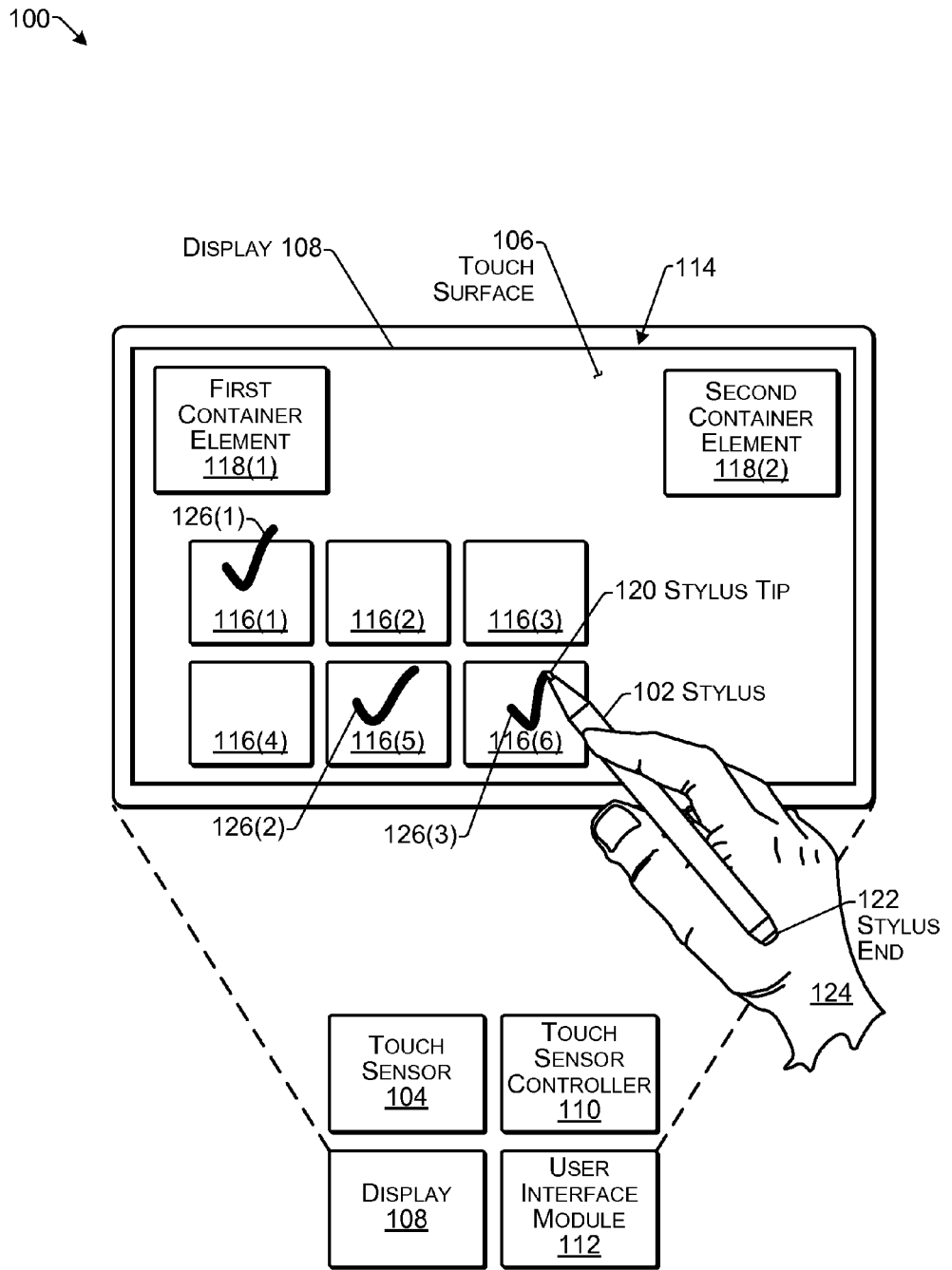
FIGS. 1A-1E illustrate example user interactions with an electronic device using a stylus according to some implementations.

This disclosure includes techniques and arrangements for using a stylus to interact with an electronic device. For example, the stylus may provide touch inputs that are detected or otherwise received by a touch sensor of an electronic device. The touch sensor and/or the electronic device may distinguish between touch inputs received from the stylus and touch inputs received from other types of input objects, such as a finger. In some cases, the stylus may be used with marking and gesturing techniques that enable selecting, manipulating or otherwise interacting with graphic elements presented on a display of an electronic device. For example, a user may draw one or more first marks on one or more respective graphic elements presented on the display to mark the one or more respective graphic elements. The user can draw an additional second mark on the display to cause one or more actions to be performed with respect to the one or more marked graphic elements. In some examples, the first mark may indicate an operation to be performed, while in other examples, the second mark, or a combination of the first mark and the second mark, may indicate the operation to be performed.

As one example, suppose that the user employs the stylus to draw a first mark having a first shape on one or more graphic elements presented in a graphic user interface (GUI). For instance, each graphic element in the GUI may be an icon or other image that is representative of an object, such as a file, an application, a module, a folder, a directory, a system component, a control, a link, etc. The touch sensor of a touchscreen display may sense the location of the stylus tip with respect to the display and the image currently presented on the display. Further, input information from the touch sensor may be used to track movement of the stylus tip with respect to a touch surface of the display to determine a shape formed by the stylus tip as a touch input. Based on the touch input information received from the touch sensor, the image presented on the display may be modified by an operating system or other computer program controlling the image presented on the display for overlaying a mark in the location touched by the stylus. Thus, the mark presented on the display may correspond to the shape formed by stylus when making the touch input. In some examples, the mark may resemble an ink mark made by a pen, a pencil mark, a brush mark or the like. The image may be updated in real time so that the stylus appears to be writing on the image presented on the display at the location that the stylus tip is touching. For instance, the mark may appear to be made on or otherwise overlying a particular graphic element, or may be in proximity to the particular graphic element (e.g., a circle around the graphic element, an underline, etc.).

Suppose that the user chooses to mark, with a first mark having a first shape, such as a checkmark, several graphic elements in succession. The user may then make a second mark on the display having a different shape and thereby a different meaning from the first mark. The electronic device, upon recognizing the shape of the second mark, may perform one or more actions indicated by the first shape and/or the second shape. As one example, suppose that the user makes a circle as the shape of the second mark. The graphic elements that have been marked with the checkmark may be subject to an operation performed by the electronic device. For instance, suppose that the checkmark shape indicates that a corresponding marked graphic element is selected, and the shape of the second mark, such as circle, indicates that the graphic elements marked with the checkmarks should be moved to a location under the tip of the stylus. The user may then move the graphic elements under the tip to a desired location, or perform another suitable action.

In some examples, different shapes of marks may be used to cause different actions to be performed with respect to marked graphic elements. For example, a user may draw a first shaped mark, such as a checkmark, on a first graphic element and may draw a second shaped mark, such as an "X" mark on a second graphic element. The user may then draw a third shaped mark on the display, such as making a circle, which may indicate that an operation is to be executed. For instance, suppose that the "X" mark means that a data object corresponding to the graphic element marked with the "X" mark should be deleted, while the checkmark means that the corresponding graphic element should be moved. Following recognition of the third shaped mark, the electronic device may move the first graphic element, e.g., by moving it to a location of the stylus tip or to a designated destination, and may delete the second graphic element, e.g., by moving the second graphic element to a deleted items folder, a recycle bin, or the like. Accordingly, implementations herein provide techniques for using a stylus to interact with a GUI in a natural manner, while allowing for quick and efficient operation of common tasks.

In some examples, the electronic device 100 may include a shape-to-operation mapping that may indicate a particular operation to be performed in response to entry of a particular combination of shapes by a user using the stylus. For example, when a first shape such as an "X" is drawn on a graphic element, the "X" shape may be associated with an operation to move the graphic element to a deleted items container, which may cause an underlying object, such as a data object, application, etc., to be deleted, marked for deletion, or the like. Thus, when various shapes are drawn in combination, e.g., a first shape is drawn overlying a graphic element and a second shape is then drawn to indicate an operation should be executed, the operation to be performed for the combination of shapes may be specified in the shape-to-operation mapping. Further, the user may be provided the opportunity to specify particular shapes for particular operations and meanings, or vice versa, to enable the user to customize the shapes of the marks used and/or the operations performed.

Some example implementations are described in the environment of a stylus and touchscreen display associated with an electronic device, such as a smart phone, a tablet computing device, a laptop computing device, a digital media device, and so forth. However, the implementations herein are not limited to the particular examples provided, and may be extended to other types of devices, other types of styluses, other types of displays, other types of marks and operations, and so forth, as will be apparent to those of skill in the art in light of the disclosure herein. For example, while the examples herein are described for use with a stylus, in other examples, other input objects, such as a user's finger may be used, such as in the case that the touchscreen display is sufficiently large that a finger would enable sufficient precision for making the marks and shapes to obtain the functionality described herein.

FIGS. 1A-1E illustrate an example electronic device 100 and example user interactions with the electronic device 100 using a stylus 102 according to some implementations. The electronic device 100 may be implemented as any of a number of electronic devices, such as an eBook reader, a tablet computing device, a smart phone, a portable gaming device, a portable digital assistant, a laptop or netbook computer, and so forth. Furthermore, the electronic device 100 may not necessarily be a mobile or portable device, and thus, in some implementations may include a touchscreen display of a desktop, workstation, or server computing device, a cash register, a gaming system, a television, an appliance, industrial equipment, home electronics, or any other electronic device having a display with an associated touch sensor.

As illustrated in FIG. 1A, the stylus 102 may be used with the electronic device 100 for enabling a user to make inputs using the stylus 102. For example, the inputs may be detected or otherwise received by a touch sensor 104, such as by touching the stylus 102 to a touch surface 106, or by placing the stylus 102 near the touch surface 106 (e.g., in the case of hovering the stylus 102 over the touch surface 106). The touch sensor 104 may be capacitive, resistive, acoustic based, light based, or any other suitable type of touch sensor capable of detecting a touch input from the stylus 102 and/or capable of detecting the presence of the stylus 102. As one example, the touch sensor 104 may be a capacitive touch sensor that accepts inputs resulting from application of an input object, such as the stylus 102 (or a user's finger), on or very near to the touch sensor 104. While in some examples the touch sensor 104 may overlie or underlie the touch surface 106 on the front of the electronic device 100, in other examples, the touch sensor 104 or other touch sensors may be disposed along the other sides of the electronic device 100 instead of, or in addition to, the touch sensor 104 on the front side of the electronic device 100.

A display 108 may be configured to present information to the user as a presented image. As used herein, the term "display" may include any type of electronic device capable of visually presenting information, such as for viewing by one or more users. Thus, the display 108 may be any suitable type of display, examples of which are discussed below. Further, in some implementations, the display 108 may be combined with the touch sensor 104 to provide a touchscreen display, the outer surface of which serves as the touch surface 106. The touch sensor 104 may be located above the display 108 (i.e., over top of the display surface), under the display 108 (i.e., behind the display surface) or within the display 108.

A touch sensor controller 110 may collect or otherwise receive touch input information from the touch sensor 104, and provide the touch input information to a user interface module 112. For example, the user interface module 112 may be executed by a processor (not shown in FIG. 1A) on the electronic device 100, and may accept inputs received by the touch sensor 104. In some cases, the user interface module 112 may be part of an operating system of the electronic device 100, while in other cases, the user interface module 112 may be part of another computer program, such as an application, executed on the electronic device 100. In some examples, user touch inputs, such as from a palm or finger, may be ignored or rejected based on the detection of the presence of the stylus within a predetermined distance of the touch surface 106, and/or based on other considerations.

The user interface module 112 may provide a graphic user interface (GUI) 114 presented as an image on the display 106. In the illustrated example, the GUI 114 includes a plurality of graphic elements 116(1)-116(6), which may be icons or any other suitable type of graphic element that is representative of an underlying object or item, such as a page of a notebook, a file, an application, a program module, a folder, a directory, a system component, a control, a device feature, or the like. The GUI 114 in this example also includes a plurality of container elements 118(1) and 118(2). For example, the container elements 118 may be graphic elements that are representative of notebooks, folders, catalogs, drawers, bins, or any other object capable of conceptually or otherwise virtually receiving another object, item, etc. As one example, the first container element 118(1) may represent a recycle bin, trash container, deleted items folder, or the like, and the second container element 118(2) may represent a file folder.

The touch surface 106 may be of any suitable material depending on the design and intended function of the electronic device 100. In some cases, the touch surface 106 may be a transparent protective layer, such as a plastic or glass layer, formed over a transparent touch sensor layer that may include an electrode grid of the touch sensor 104. In other cases, the touch sensor 104 may be embedded in or otherwise included in the touch surface 106. As another alternative, the touch sensor 104 may be located underneath the display 108. Thus, in some cases, the touch surface 106 may be integrated with the display 108.

In some examples, the touch sensor 104 may include a plurality of linear touch sensor conductors arranged in respective rows and columns, which are typically formed as a grid of conductors. The touch sensor 104 may be in communication with the touch sensor controller 110, which, in the case of a capacitive touch sensor, receives electrical inputs from the conductors in the touch sensor 104 for detecting a capacitive coupling with an input object such as the stylus 102, a user's finger, or the like. For example, the touch sensor controller 110 may periodically scan the touch sensor 104 (typically on the order of milliseconds). In some implementations, by performing periodic scans, the touch sensor controller 110 may periodically quantify any capacitance readings from the touch sensor 104 for sensing any inputs made by a user.

Types of information that may be determined from scanning the touch sensor 104 may include a location of an input object with respect to a touch sensor grid (e.g., an x-y location of the stylus, finger or other input object); a distance of an input object from the touch surface 106 (e.g., a z-axis distance from the touch surface); a size of the input object; a shape of the input object; and movement (e.g., speed and direction) of the input object. Various different input objects may generate different signal profiles. For example, if a user performs a swipe using an entire hand, rather than a single finger, the capacitive effect will be larger than for a single finger, and spread out over a broader area of the touch sensor 104. Similarly, the difference between a stylus touch input and a finger touch input can be determined based on a difference in the signal profile detected when scanning the conductors of the touch sensor 104. Further, a difference between the stylus tip touching the touch surface 106 and hovering over the touch surface 106 may also be detected based on a difference in signal profiles detected from scanning the touch sensor 104.

Based on the touch sensor controller 110 receiving a series of scans over a period of time, movement of the input object, e.g., in the x-y direction, can be detected and quantified to enable recognition of gestures or other shapes. Accordingly, touch sensor information may include a sequence of scan data indicating a location of the stylus tip with respect to at least one reference point. As one example, as the user touches the stylus tip to the touch surface 106, and drags the stylus tip along the touch surface 106, such as when drawing a mark, the position of the stylus tip may be detected periodically, such as every ten milliseconds, and the position may be sent to the user interface module 112 as sequence of touch sensor scan data indicting sequential movement of the stylus tip.

Furthermore, based on the immediately previous position and the current position, the user interface module 112 may present a mark on the display, such as a line between locations corresponding to the immediately previous position and the current position of the stylus tip. The display 108 may have a sufficiently high refresh rate so that the line can be presented on the display 108 as the user moves the stylus tip, resulting in the appearance to the user that the user is drawing a mark on the display with the stylus 102. For example, the touch sensor controller 110 may provide the scan data as touch sensor information to the user interface module 112, which generates (or otherwise causes to be generated) an updated GUI image based on the touch sensor information, where the updated GUI image includes the mark that appears to be drawn by the user.

In addition, when the electronic device 100 determines that the user has completed drawing a shape, e.g., based on detecting that the movement of the stylus tip has stopped or that the stylus tip has been lifted off of the touch surface 106, the user interface module 112 may attempt to recognize the shape by comparing the detected shape with one or more shape profiles. For example, the user interface module may maintain a shape profile data structure (not shown in FIG. 1) that can be used to match and thereby recognize particular shapes that may be drawn by a user, such as in a manner similar to optical character recognition. As one example, matrix matching (aka "pattern matching") includes comparing a received shape to a stored shape, such as a glyph, e.g., on a pixel-by-pixel basis. One or more thresholds may be used to allow leeway for some differences between the input shape and the stored shape. As another example, feature extraction may be used to decompose shapes into features, such as lines, closed loops, line directions and line intersections. These features may be compared with an abstract vector-like representation of a shape to attempt to determine a match within one or more matching thresholds. For instance, a nearest neighbor classifier, such as a k-nearest neighbors algorithm, may be used to compare received shape features with stored shape features and choose the nearest match, if any.

Thus, a shape made by a user with the stylus may be recognized based on a similarity, within one or more thresholds, for determining a match to one the shape profiles stored in the shape profile data structure. Consequently, shapes made by the user that match a shape profile within the one or more thresholds may be determined to be a recognized shape corresponding to a particular shape profile. On the other hand, shapes made by the user that are outside the matching thresholds for any shape in the shape profile data structure may remain unrecognized. Accordingly, the user interface module 112 may identify and characterize various touch inputs, distinguish between types of touches, reject palm touches or other extraneous touches, provide input data to an operating system or application currently presenting the GUI image or other image on the display 108, and so forth.

Also depicted in FIG. 1A is the stylus 102 having two opposing terminal structures, namely, a stylus tip 120 and a stylus end 122. The stylus tip 120 is shown in contact with the touch surface 106. In some implementations, the stylus tip 120 may be configured to be non-marking such that it operates freely without depositing a visible trace of material, and without scratching the display 108 or the touch surface 106. The stylus 102 may be a passive or active stylus, as discussed additionally below, and depending in part on the type of touch sensing used. Further, in some examples, the stylus 102 may include a magnet (not shown) to enable the electronic device 100 to sense an orientation of the stylus 102, such as for determining whether the stylus tip 120 or the stylus end 122 is proximate to or touching the touch surface.

As mentioned above, in some examples, the stylus 102 may be a passive stylus able to be used with a capacitive touch sensor of the electronic device 100. In such a case, the stylus 102 may be at least partially electrically conductive to establish a capacitive coupling between a capacitive touch sensor and a user's hand 124 in a manner similar to a user's finger. As one example, a passive stylus may include a conductive stylus tip and a conductive stylus body. According to some implementations, a capacitive touch sensor may include an electrode grid, also referred to as a crosspoint array, including a first plurality of parallel conductors aligned in a first direction, and a second plurality of parallel conductors aligned in a second direction to cross over the first plurality of conductors. Furthermore, a capacitive touch sensor according to some implementations may accurately distinguish between a stylus tip touching the touch surface 106, and the stylus tip hovering over the touch surface 106 up to a certain distance away from the touch surface 106. In this configuration, the stylus 102 may be considered a passive stylus at least because the stylus 102 may not employ an onboard power source for operation. Accordingly, because an electrical connection may be formed between the user's hand and the stylus 102, the stylus 102 may function as an extension of the user's hand in a manner similar to a finger, but with a substantially smaller, more precise, touch footprint.

In other examples, the stylus 102 may be an active stylus, such as by being battery powered and/or actively communicating a location of the tip with respect to the touch surface. As one example, the stylus 102 may include an on-board transmitter (not shown) to communicate tip location, such as via radio signals. In some instances, an active stylus may generate a signal that can be detected by the touch sensor 104, or that can otherwise be received by the electronic device 100. Further, in some examples, the active stylus may indicate a pressure applied to the touch surface by the tip 120. Additionally, an active stylus may include one or more orientation sensors (e.g., accelerometers), thereby reducing or eliminating the use of a magnet in the stylus and magnetic field sensors in the electronic device 100. The orientation information may provide an indication of an angle at which the stylus 102 is disposed relative to the electronic device 100 and/or an indication of whether the stylus tip 120 or the stylus end 122 is proximate to the touch surface 106. Alternatively, in some examples, onboard orientation sensors may not be used and, instead, the active stylus may include a magnet that may be sensed by one or more magnetic field sensors associated with the electronic device 100.

As mentioned above, in some examples, the electronic device 100 may include one or more magnetic field sensors (not shown in FIG. 1A) that are accessible to the user interface module 112. A magnetic field sensor may be configured to detect and, in some implementations, characterize impinging magnetic fields along one or more mutually orthogonal axes, such as a magnetic field emitted by a magnet in the stylus 102. This characterization may include a linear field strength and polarity along each of the axes. The magnetic field sensor may allow for determining a magnetic field strength, angular bearing, polarity of the magnetic field, and so forth. The magnetic field sensor may comprise a plurality of sensing elements to provide a three-dimensional magnetic field vector. As a result, one or more magnetic field sensors may detect the position, orientation, rotation, and so forth, of a magnet included in the stylus 102.

Magnetic field sensors and or a capacitive touch sensor may further be used to detect the presence of the stylus 102 near to the touch surface 106 of the electronic device 100 prior to actual touching. Thus, the information regarding the near proximity of the stylus may be used for palm rejection and rejection of other touches that are not intended to be inputs. In other words, when the stylus 102 is detected as being close to the touch surface 106, it is likely that the stylus is being held in a user's hand, and any detected touch that looks like a palm or heel of a hand may be rejected.

In addition, one or more orientation sensors (not shown in FIG. 1A) such as accelerometers, gravimeters, gyroscopes, or the like, may also be present in the electronic device 100, and may be used for determining an orientation of the electronic device 100, as well as for providing a reference for determining an orientation of the stylus 102. Additionally, while several example components of the electronic device 100 and the stylus 102 have been described above, numerous other components not specifically described may be included in these devices, as will be apparent to those of skill in the art in light of the disclosure herein.

In the example of FIG. 1A, suppose that the user employs the stylus 102 to draw a first mark having a first shape, i.e., a checkmark in this example, on the graphic elements 116(1), 116(5) and 116(6) presented in the GUI 114. Thus, the user may draw a first checkmark 126(1) on the first graphic element 116(1), a second checkmark 126(2) on the fifth graphic element 116(5), and a third checkmark 126(3) on the sixth graphic element 116(6). The touch sensor 104 may sense the location of the stylus tip 120 and movement of the stylus tip 120 with respect to display 108 for determining a shape formed by a touch input. The user interface module 112 may further determine the GUI image, including any graphic elements, currently presented on the display 108. Based on the input from the touch sensor 104, the image presented on the display may be modified by the user interface module 112 to present the checkmarks 126(1)-126(3) in the shapes and locations drawn using the tip 120 of the stylus 102.

Figure 1B:
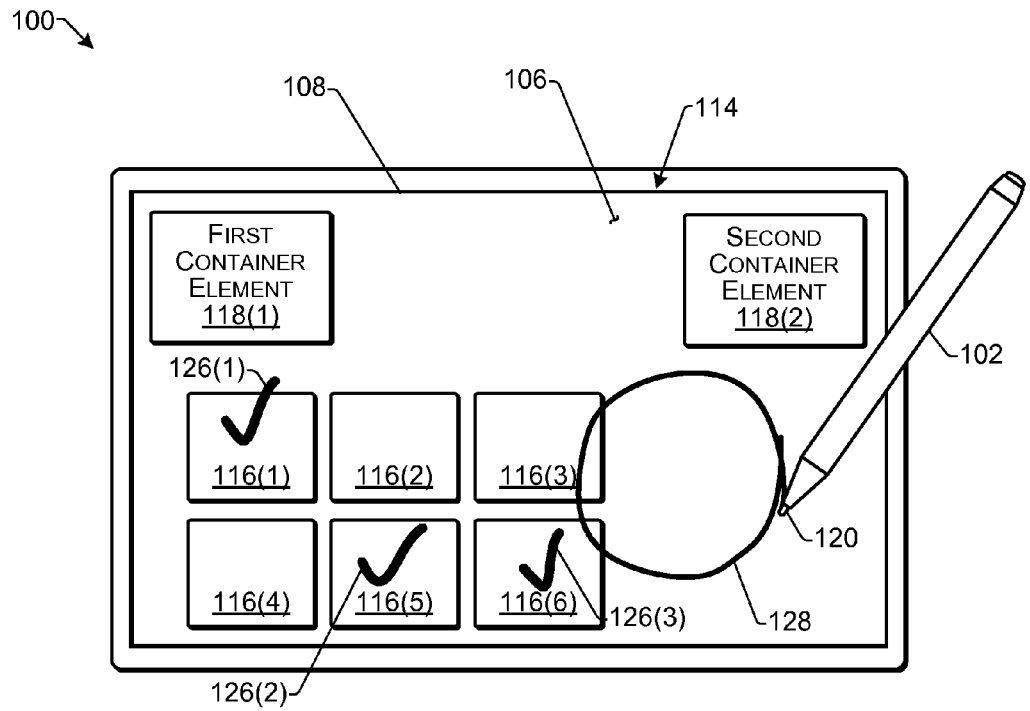

FIG. 1B illustrates additional example user interactions with the electronic device 100 using the stylus 102 according to some implementations. For instance, following marking of the three graphic elements 116(1), 116(5) and 116(6) with three respective checkmark shapes, the user may use the stylus 102 to draw a second mark 128 on the display, which may have a different shape and different meaning from the first mark 126. In this example, the second mark 128 is shaped as a circle; however, in other examples, the second mark 128 may be any suitable shape distinguishable to the user and the electronic device 100, such as a letter, other geometric shape, etc. Further, in some examples, the second mark 128 may be drawn at any suitable location on the display, e.g., without regard to the marks 126 already drawn, and without regard to any specific graphic element. In other examples, such as discussed below, the second mark 128 may be drawn in a more specific location on the display, such as at a location overlapping one or more particular graphic elements. As another alternative, such as in the case that the mark is a circle, the circle may overlap or encircle particular graphic elements or particular marks 126 already drawn, for which a particular operation is desired to be effected.

In the illustrated example, the shape of the first mark 126 (i.e., the checkmark) may indicate that the checked graphic element is selected, and the shape of the second mark 128 (i.e., the circle) may indicate that an operation is to be performed with respect to the selected graphic elements 116(1), 116(5) and 116(6). For instance, upon completion of the user drawing the second mark 128, the user interface module 112 may recognize the shape of the second mark 128, and may associate the shape of the mark 128 with the indicated operation. For example, a plurality of differently shaped of marks may be each associated with respective different operation to be performed when the stylus 102 is used to draw the respective marks on the touch surface 106.

Figure 1C:
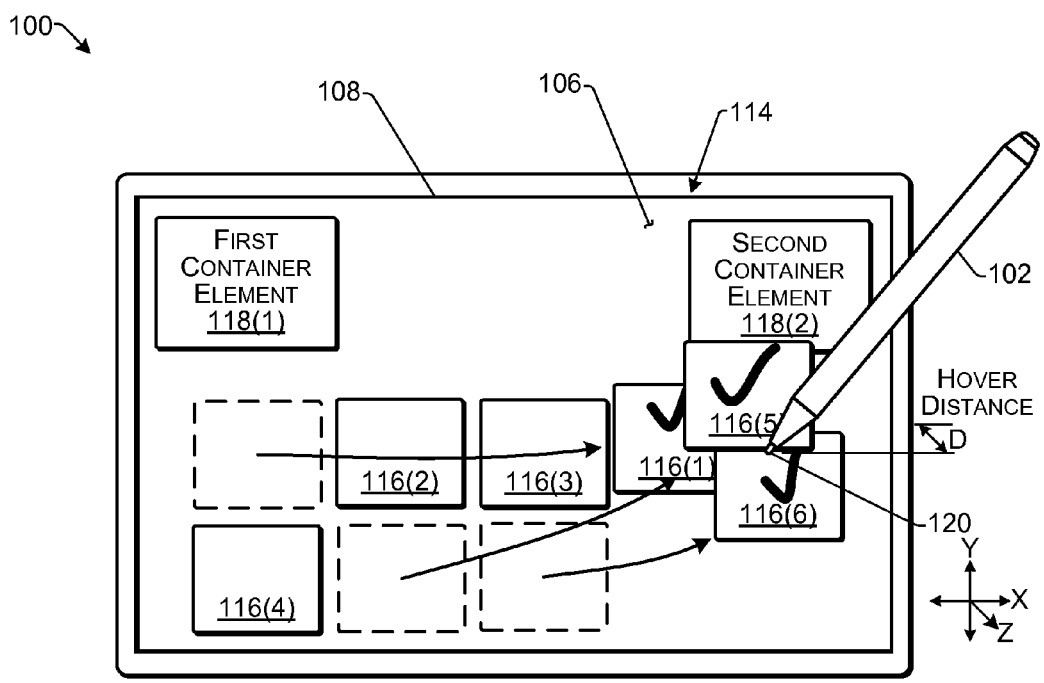

As illustrated in FIG. 1C, in this example, the second mark 128 may indicate that the selected graphic elements 116(1), 116(5) and 116(6) are to be moved to a location under the tip 120 of the stylus 102. As one example, following formation of the mark 128 with the stylus 102, as illustrated in FIG. 1B, the user may hold the tip 120 of the stylus 102 in a hover position, e.g. at a hover distance D above the touch surface 106, as illustrated in FIG. 1C. For instance, the touch surface 106 may correspond to an x-y plane and, after drawing the second mark 128, the tip 120 of the stylus 102 may be moved in a z-axis direction away from the touch surface 106 to the hover distance D. The touch sensor 104 can detect the location of the stylus tip 120 within a certain z-axis distance from the touch surface 106 of the electronic device, with the maximum detectable hover distance being at least partially dependent on the type of stylus 102, type of touch sensor 104, the calibrated sensitivity of the touch sensor 104, and so forth. Accordingly, the user interface module 112 may cause the selected graphic elements 116(1), 116(5) and 116(6) to appear to move to a location underneath the tip 120 of the stylus 102 and thereby gather under the tip 120. For instance, a portion of each graphic element 116(1), 116(5) and 116(6) might remain partially visible to provide an indication of how many graphic elements are gathered under the tip 120. Further, the graphic elements 116(1), 116(5) and 116(6) may be virtually glued or otherwise virtually attached to the tip 120, such that movement of the tip 120 in the x-axis and/or y-axis direction causes similar movement of the graphic elements 116(1), 116(5) and 116(6). Thus, movement of the tip 120 in an x-y direction may drag the graphic elements 116(1), 116(5) and 116(6) in the same direction. Further, should the tip 120 of the stylus 102 exceed the maximum detectable z-axis distance, the graphic elements 116(1), 116(5) and 116(6) may remain at the last detected location of the tip 120 until the tip 120 is brought back into a detectable range of the touch surface 106. As an alternative, rather than indicating that the graphic elements 116(1), 116(5) and 116(6) should be moved to the location of the stylus tip, the circle 128 may indicate that the selected graphic elements 116(1), 116(5) and 116(6) should be moved to a location at the center of the circle 128, or any of other numerous possible variations. Further, in some examples, the movement of the graphic elements to the location under the tip may be animated, while in other examples, the movement of the graphic elements to the location under the tip may be made on the next refresh of the image presented on the display.

Figure 1D:
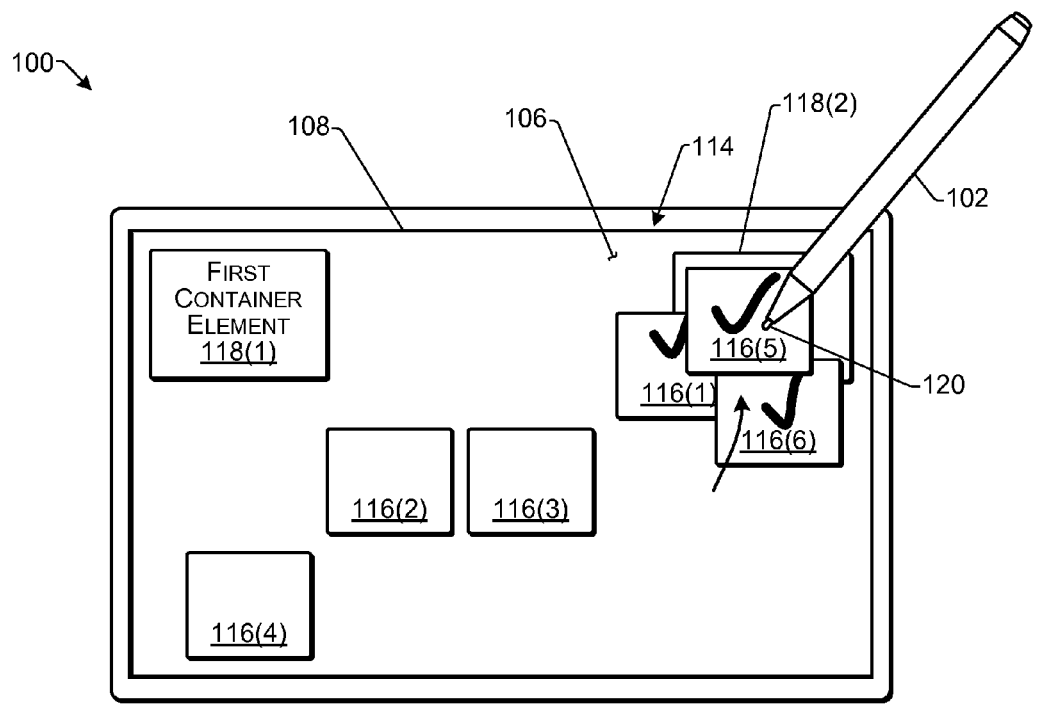

As illustrated in FIG. 1D, suppose that the user desires to place the graphic elements 116(1), 116(5) and 116(6) in the second container element 118(2), which as mentioned above may be a folder or other suitable container for the graphic elements. The user may move the stylus tip 120 to an x-y location over the second container element 118(2) and may tap or otherwise touch the stylus tip 120 to the touch surface over the image of the second container element 118(2) to release the graphic elements 116(1), 116(5) and 116(6) into the container element 118(2). As several other examples, the user may shake the stylus tip 120, or draw the stylus tip 120 out of detectable range of the touch sensor 104 to release the graphic elements 116(1), 116(5) and 116(6) into the container element 118(2).

Figure 1E:
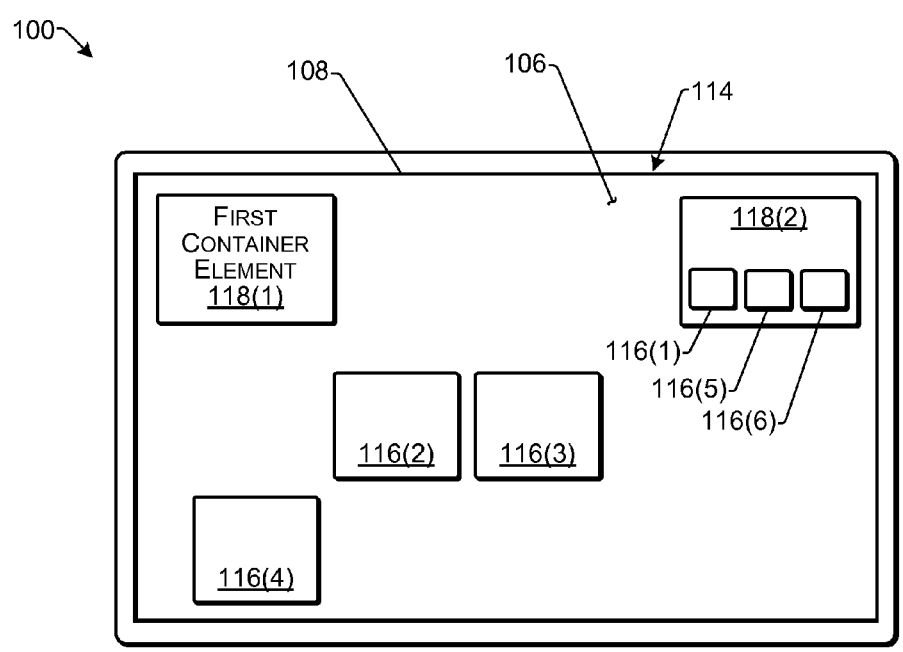

As illustrated in FIG. 1E, the above-described drag and drop action may cause the graphic elements 116(1), 116(5) and 116(6) to be virtually moved into the second container element 118(2). Thus, the graphic elements 116(1), 116(5) and 116(6) are virtually included in the second container element 118(2). Subsequently, the user may open the second container element 118(2) to access the graphic elements 116(1), 116(5) and 116(6), and thereby the underlying objects, items or features that they represent. Further, while the example of FIGS. 1A-1E is illustrated as a move operation, in other examples, similar techniques may be used for a copy operation, a delete operation, a resize operation, and so forth, as discussed additionally below.

In addition, as another alternative, rather than having the tip 120 of the stylus 102 hover over the touch surface 106, as described above with respect to FIG. 1C, the tip 120 may be maintained in contact with the touch surface 106 following drawing of the second mark 128. Accordingly, the graphic elements 116(1), 116(5) and 116(6) may gather together under the location at which the tip 120 is touching the touch surface 106. The user may move the tip 120 of the stylus 102 over to the second container element 118(2) by dragging the tip 120 across the touch surface 106, while maintaining the tip 120 of the stylus 102 in contact with the touch surface 106. When the tip 120 is located over the second container element 118(2), the user may pull the tip 120 away from the touch surface 106 in the z-axis direction, which may indicate that the graphic elements 116(1), 116(5) and 116(6) are to be dropped into the second container element 118(2). Alternatively, the user may shake the tip 120, double tap the tip, etc., to release the gathered graphic elements 116(1), 116(5) and 116(6) into the second container element 118(2). Accordingly, user interface module 112 may cause the operating system or other computer program to execute the underlying move operation, which may typically include changing metadata associated with the underlying objects represented by the graphic elements 116(1), 116(5) and 116(6) to associate these objects with a container object corresponding to the second container element 118(2). Numerous other alternative techniques and operations will be apparent to those of skill in the art having the benefit of the disclosure herein.

Figure 2A:
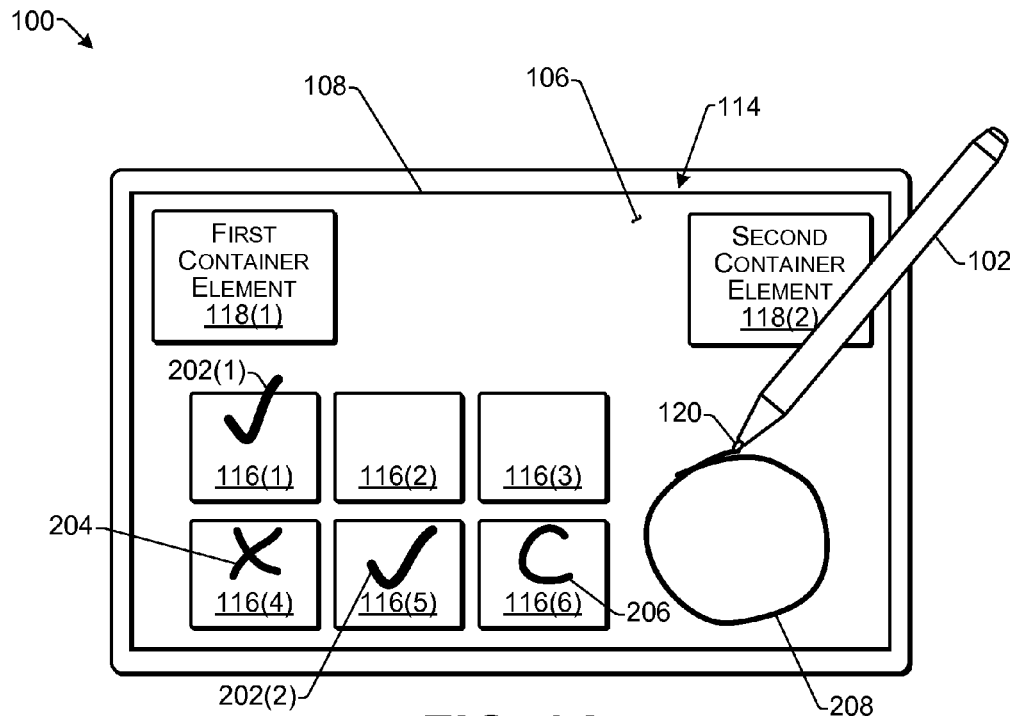
FIGS. 2A-2B illustrate example user interactions with an electronic device using a stylus according to some implementations.
Figure 2B:
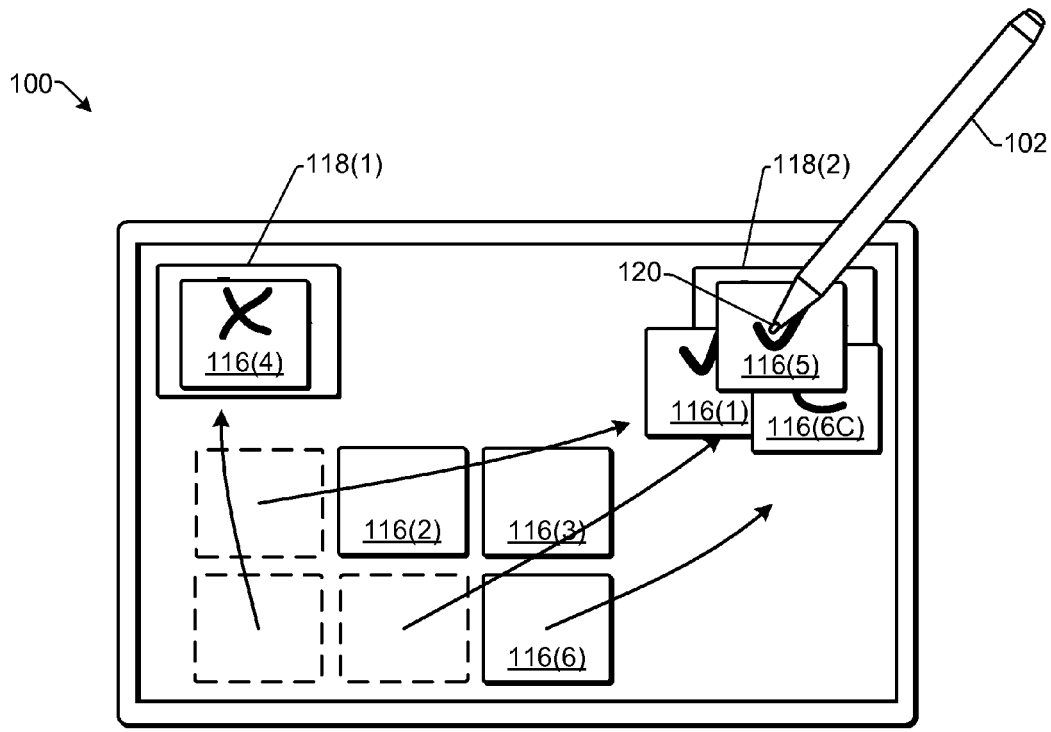

FIGS. 2A-2B illustrate an example of user interactions with the electronic device 100 using the stylus 102 according to some implementations. In this example, the user may make a plurality of differently shaped marks on different respective graphic elements 116, which may cause respective different types of operations to be performed based on the different shapes of the marks. For example, a user may cause various different types of operations to be performed by the electronic device 100 through the user interacting with graphical elements presented on the display 108. Examples of different types of operations may include a drag operation or other move operation, a copy operation, a delete operation, a select operation, a drop operation, and various other operations for manipulating graphical elements corresponding to data objects. Additional types of operations may include control operations, such as for adjusting a control setting, or turning on or off a control; application operations, such as for executing or interacting with an application; operating system interactions, and so forth. Thus, types of operations, as referred to herein, may include any of various different actions executed by the electronic device 100 at least partially in response to receiving user interactions via the GUI 114.

Furthermore, execution of an operation on or otherwise with respect to a graphical element may cause execution of a related operation to an underlying object, control, etc., that is represented by the graphical element. For example, a move operation may cause the graphical element to be moved in the GUI 114 from a first position to a second position. Continued movement of the graphical element into a container element 118 may not only cause the GUI 114 to be updated to show that the graphical element is now contained in the container element, but may also cause a related second operation to be performed on the underlying data object represented by the graphical element. For example, metadata of one or more data objects represented by the graphical element and the container element may be changed to indicate that the data object corresponding to the graphical element is now affiliated with the data object corresponding to the container element.

As illustrated in FIG. 2A, suppose that the user makes a first type of mark 202 having a first shape, such as a checkmark, on two graphic elements, e.g., mark 202(1) on graphic element 116(1) and mark 202(2) on graphic element 116(5). Further, suppose that the user makes a second type of mark 204, having a second shape, which in this example resembles an "X", on the fourth graphic element 116(4), and also makes a third type of mark 206, having a third shape, which in this example resembles a "C", on the sixth graphic element 116(6).

The user may then draw a fourth type of mark 208, having a fourth shape, which in this example is a circle, to cause execution of one or more operations with respect to the marked graphic elements 116(1), 116(4), 116(5) and 116(6). For example, suppose that the first type of mark 202 having the first shape (i.e., the checkmark) generally indicates the corresponding graphic element is selected for some operation, such as being moved in this example. Further, suppose that the second type of mark 204 having the second shape (i.e., the "X") indicates that the corresponding graphic element is selected for deletion. Further, suppose that the third type of mark 206 having the third shape (i.e., the "C") indicates that the corresponding graphic element is selected to be copied. Accordingly, when the user makes the fourth mark 208 having the fourth shape (i.e., the circle), then similar to the example of FIGS. 1A-1E, different operations may be performed with respect to the differently marked graphic elements 116(1), 116(4), 116(5) and 116(6). For instance, if the first container element 118(1) represents a recycle bin, deleted items folder, or the like, the fourth graphic element 116(4) on which the "X" was marked may move without additional user interaction into the first container element 118(1), and the interface module 112 may cause the operating system to delete, or mark for deletion, an item or other object corresponding to the fourth graphic element 116(4).

Furthermore, the first graphic element 116(1) and fifth graphic element 116(5) that are marked with the checkmarks may be gathered under the tip 120 of the stylus 102 similar to the example discussed above with respect to FIGS. 1A-1E. Additionally, since the sixth graphic element 116(6) was marked with the "C", rather than a checkmark, a copy of the sixth graphic element 116(6C) may be presented at a location under the tip 120 of the stylus 102 with the first and fifth graphic elements, and the sixth graphic element 116(6) may remain presented on the display in its original position. The user may drag the gathered graphic elements 116(1), 116(5) and 116(6C) to the second container element 118(2), and may drop the gathered graphic elements into the second container element 118(2) using any of the techniques discussed above with respect to FIGS. 1A-1E. Thus, the first graphic element 116(1), the fifth graphic element 116(5) and the copy of the sixth graphic element 116(6C) are moved into the second container element 118(2), the fourth graphic element 116(4) is moved into the first container element 118(1) as a deleted item, while the second graphic element 116(2), the third graphic element 116(3) and the sixth graphic element 116(6) remain in their original positions in the GUI 114.

Figure 3A:
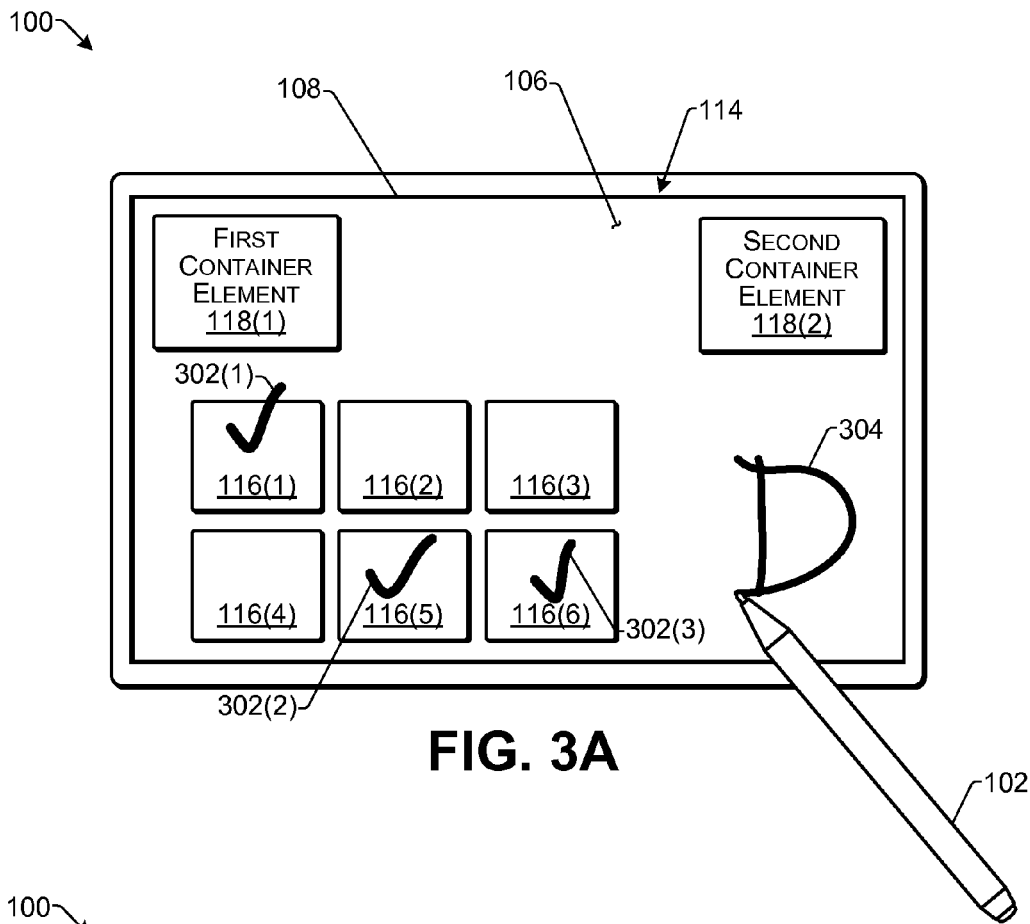
FIGS. 3A-3B illustrate example user interactions with an electronic device using a stylus according to some implementations.
Figure 3B:
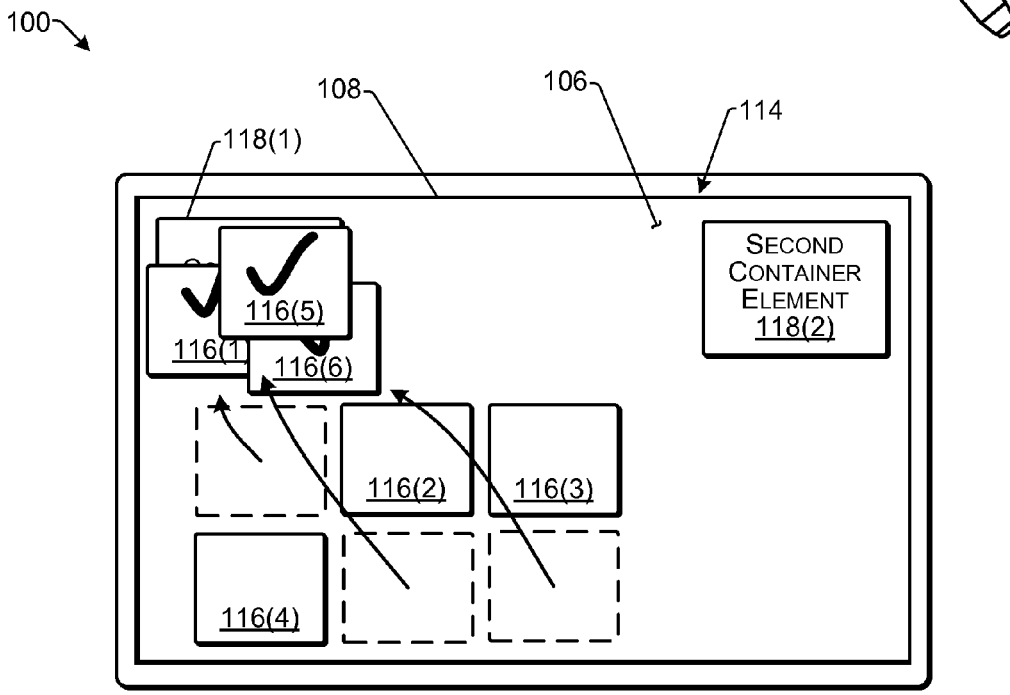

FIGS. 3A-3B illustrate an example of user interactions with the electronic device 100 using the stylus 102 according to some implementations. In this example, as illustrated in FIG. 3A, and similar to the example discussed above with respect to FIG. 1A, suppose that the user makes a first type of mark 302 having a first shape, such as a checkmark, on several of the graphic elements 116. For instance, the user may make a mark 302(1) on the first graphic element 116(1), a mark 302(2) on the fifth graphic element 116(5), and a mark 302(3) on the sixth graphic element 116(6). Next, rather than making a circle as a second type of mark, as discussed above, suppose that the user makes a "D" as a second type of mark 304 having a second shape that is different from the first shape. Further, suppose that the "D" mark indicates that the marked graphic elements are to be moved to a deleted items folder (i.e., for deleting the corresponding items or objects that they represent). Accordingly, as illustrated in FIG. 3B, in response to recognizing that the user has drawn a "D" as the second type of mark 304, the user interface module 312 may move the marked graphic elements 116(1), 116(5) and 116(6) into the recycle bin, deleted items folder, etc., which in this example may correspond to the first container element 118(1). For instance, the movement may be performed without any additional interaction from the user or the stylus 102.

Additionally, in the examples described herein, the order of making the marks may be reversed. For instance in the example of FIGS. 3A-3B, suppose that the user draws the "D" mark 304 first, and then checks the graphic elements 116(1), 116(5) and 116(6) for deletion. The user may then perform an additional operation to initiate execution of the deletion function, such as double tapping the touch surface 106 with the stylus tip 120, or any other suitable distinguishable input. Alternatively, the user may simply wait until a predetermined period of time has passed, and the operation may be performed automatically upon the predetermined period elapsing. The order of the marking in the other examples described herein, including FIGS. 1A-1E and 2A-2B, discussed above, may be similarly reversed.

Further, while FIGS. 3A-3B illustrate a select-and-delete function in this example, in other examples, numerous other types of operations may be caused to be executed using differently shaped second marks 304. For example, rather than making a "D" shaped mark as the second type of mark 304, the user may make a mark shaped e.g., as an upward pointing arrow, (↑) as the second type of mark 304, which may indicate that the selected graphic elements 116(1), 116(5) and 116(6) should be made bigger in size relative to the other graphic elements 116(2), 116(3) and 116(4). For example, a length of the arrow drawn as the second type of mark 304 may indicate how much larger the selected graphic elements should appear on the display 108 relative to the non-selected graphic elements 116(2), 116(3) and 116(4). Similarly a downward pointing arrow (↓) made as the second type of mark 304 may indicate that the selected graphic elements 116(1), 116(5) and 116(6) should be made to appear smaller than the non-selected graphic elements 116(2), 116(3) and 116(4), with the length of the downward pointing arrow indicating how much smaller the selected graphic elements should be made to appear. Several examples of other types of operations may include shapes symbolizing "add to playlist," "add to shopping cart," "add to wish list," "add to favorites," "pin selected item to a location," "remove selected item from a carousel," and so forth. Additionally, in some examples a third type of mark may be made after the second type of mark 304, such as to indicate an additional action to the selected graphic element 116(1), 116(5) and 116(6), e.g., "repeat the previous operation."

Figure 4:
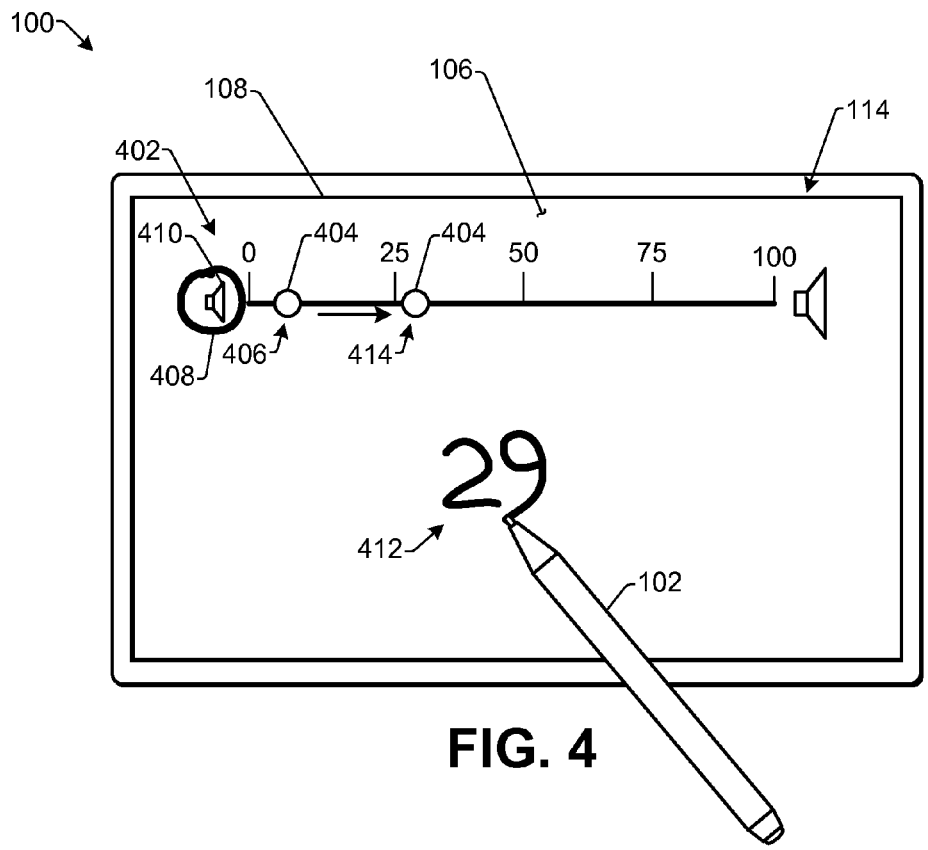
FIG. 4 illustrates example user interactions with an electronic device using a stylus according to some implementations.

FIG. 4 illustrates example user interactions with an electronic device 100 using a stylus 102 according to some implementations. In this example, suppose that the user has accessed a slider control 402 that may be used to control a feature of the electronic device 100. In the illustrated example, the slider control 402 may be for controlling speaker volume, but numerous other controls may be similarly managed such as display brightness, display contrast, display colors, and media playback scrubbing, to name a few. For example, suppose that the initial volume setting is represented by a slider graphic element 404 positioned on the slider control 402 at a location indicated at 406, and the user wants to increase the volume. The user may draw a circle 408 around a speaker-shaped graphic element 410 associated with the slider control 402, as illustrated in FIG. 4. Alternatively, the user might draw the circle 408 around the slider graphic element 404, draw a checkmark on the slider graphic element 404, or make another suitable type of mark to indicate that the volume is desired to be controlled. Subsequent to making the first mark 408, the user may enter a number 412 corresponding to a desired position of the slider graphic element 404 on a scale of the slider control 402 to cause slider graphic element 404 to be moved to the desired position. Accordingly, in this example, suppose that the user uses the stylus 102 to draw the circle 408 around the speaker graphic element 410, and then draws the number 29 on the display 108, as indicated at 412 to cause execution of the desired action, i.e., changing of the volume level.

In response to recognizing the number 29 as the second mark 412, the user interface module 112 may cause the slider graphic element 404 to move to the indicated position on the slider control scale corresponding to 29, i.e., 29 percent on a scale of 0 to 100, as indicated at 414. Accordingly, the techniques herein may provide precise control of the position of a slider in the touch-based GUI 114. Further, as mentioned above, as an alternative implementation, the order of the stylus touch inputs may be reversed. For example, the user may first draw the number 29, and may then draw the circle 408 around the speaker graphic element 410 or the slider graphic element 404. Upon recognizing the number, the user interface module 112 may communicate the input to the appropriate operating system module for controlling the sound driver of the electronic device 100 and thereby controlling the volume of the speakers. As another alternative, following drawing of the circle 408, rather than entering a number, the user may draw a different mark, such as a vertical line, a checkmark, an X-mark, etc., at a desired location on the slider scale to which the user would like the slider element 404 to move.

As an alternative to the example shown in FIG. 4, rather than accessing or causing presentation of the slider control, the user may draw, using the stylus 102, a shape as a first type of mark that represents a speaker or otherwise represents volume control. For instance, the shape may resemble a speaker icon, such as being similar to the speaker graphic element 410, or may be any other suitable shape that has been designated to represent sound volume. The user may then draw an upward pointing arrow (↑) as a second shape to indicate that the volume should be increased, with the length of the arrow indicating an amount to increase the volume. Similarly, a downward pointing arrow (↓) drawn as the second shape may indicate that the volume should be decreased, with a length of the downward arrow indicating how much the volume should be decreased.

As still another alternative to the example shown in FIG. 4, rather than accessing or causing presentation of the slider control, the user may draw, using the stylus 102, a shape as a first type of mark that represents a speaker icon, such as being similar to the speaker graphic element 410, or otherwise representing volume control. The user may then write a number 412 to indicate a volume level to which the user would like the sound adjusted. Numerous other control variations will be apparent to those of skill in the art having the benefit of the disclosure herein.

Figure 5:
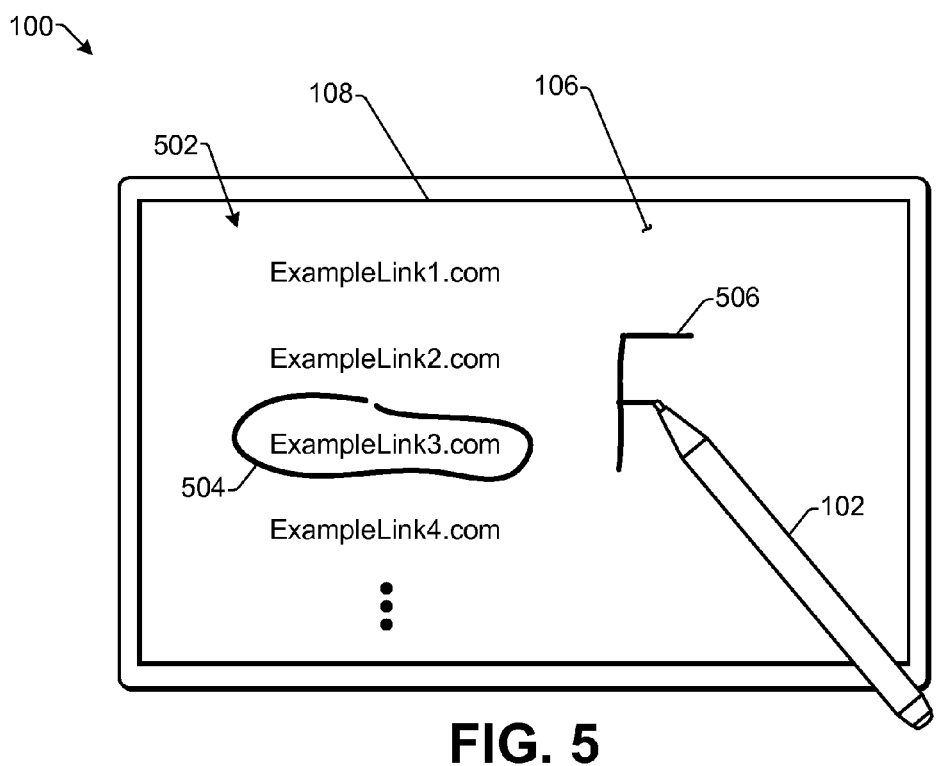
FIG. 5 illustrates example user interactions with an electronic device using a stylus according to some implementations.

FIG. 5 illustrates example user interactions with an electronic device 100 using a stylus 102 according to some implementations. In the example of FIG. 5, suppose that a user has performed an online search, accessed webpage, or otherwise has accessed and/or caused to be presented a the listing 502 of one or more links, such as hyperlinks to online locations, network resources, websites, webpages, etc. Furthermore, suppose that the user would like to save one of the presented links, e.g., "ExampleLink3" to the user's list of favorite bookmarks, or the like. Accordingly, the user may use the stylus to draw a first mark 504, having a first shape, such as a circle, around the link "ExampleLink3" presented on the display 108. Alternatively, the user may make a checkmark over or adjacent to the "ExampleLink3." The user may then draw a second mark to indicate a desired action with respect to the encircled or otherwise marked link. Thus, in this example, suppose that the user draws a second mark 506, having a second shape, such an "F" to indicate that the link should be added to the user's favorites. Upon recognizing the "F," the user interface module 112 may cause the operating system, a browser, or other computer program to add the encircled link to the user's list of favorites. Furthermore, as discussed above, in other examples the order in which the marks 504 and 506 are drawn by the stylus may be reversed.

Similarly to the example discussed above in FIG. 5, the user may use the stylus to draw a first shape to select an image, such as a photograph on webpage, e.g., by drawing a circle around the image, or by placing a checkmark on the image. The user may then draw a second shape that indicates that the image is to be downloaded or saved to the user's electronic device 100. Similarly, the user may draw a rectangle on a portion of an image, and may then draw a second shape that indicates that the image should be cropped to the portion of the image within the boundaries of the rectangle. Numerous other variations are possible, with the foregoing being just several examples for discussion purposes.

Figure 6:
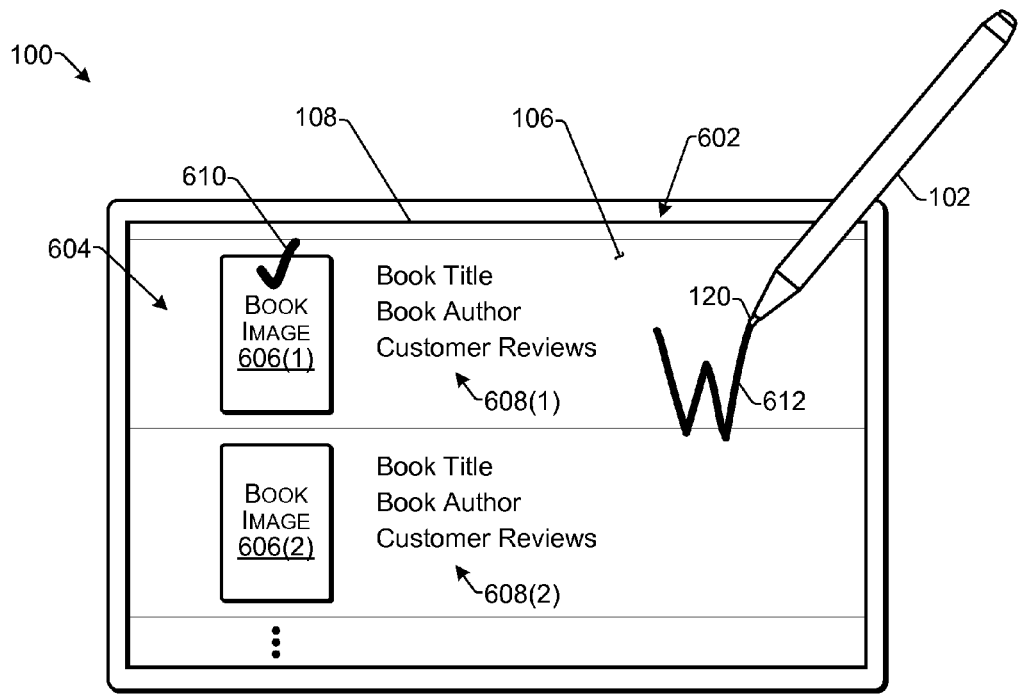
FIG. 6 illustrates example user interactions with an electronic device using a stylus according to some implementations.

FIG. 6 illustrates example user interactions with an electronic device 100 using a stylus 102 according to some implementations. In this example, suppose that the user has accessed a site, such as an online store, webpage, or the like, which provides information for presentation of an interface 602 that includes a list 604 of a plurality of items, such as books, for sale. For example, the site 602 may present book images 606 and other book information 608, such as title, author, customer reviews, and so forth. The user may scroll through the list 604 of books, and may add books to a shopping cart, a wish list, a list of books already read, or the like. For example, the user may use a finger or the stylus 102 to scroll through the list 604. Thus, in the illustrated example, a first book image 606(1) and corresponding book information 608(1), and a second book image 606(2) and corresponding book information 608(2) may be presented on the display 108.

Suppose that the user would like to add the first book, corresponding to book image 606(1) to a wish list. Accordingly, the user may make a first mark 610 having a first shape, such as a checkmark, on the book image 606(1), and may make a second mark 612, having a second shape such as a "W." Upon recognizing the second mark 612 as the "W," the user interface module 112 may determine that a checkmark combined with a "W" indicates that the item marked with the checkmark should be added to a wish list. Thus, the user interface module 112 may cause a browser or other computer program to add the first book to the user's wish list. As another alternative, if the user had wanted to proceed with purchasing the book, the user may have made a second mark having a different shape, such as an "S," to add the first book to the user's shopping cart. Additionally, as discussed above, in other examples the user may make the "W" shape first and then select a book to add to the user's wish list such as by making a checkmark shape on a desired book image.

Figure 7:
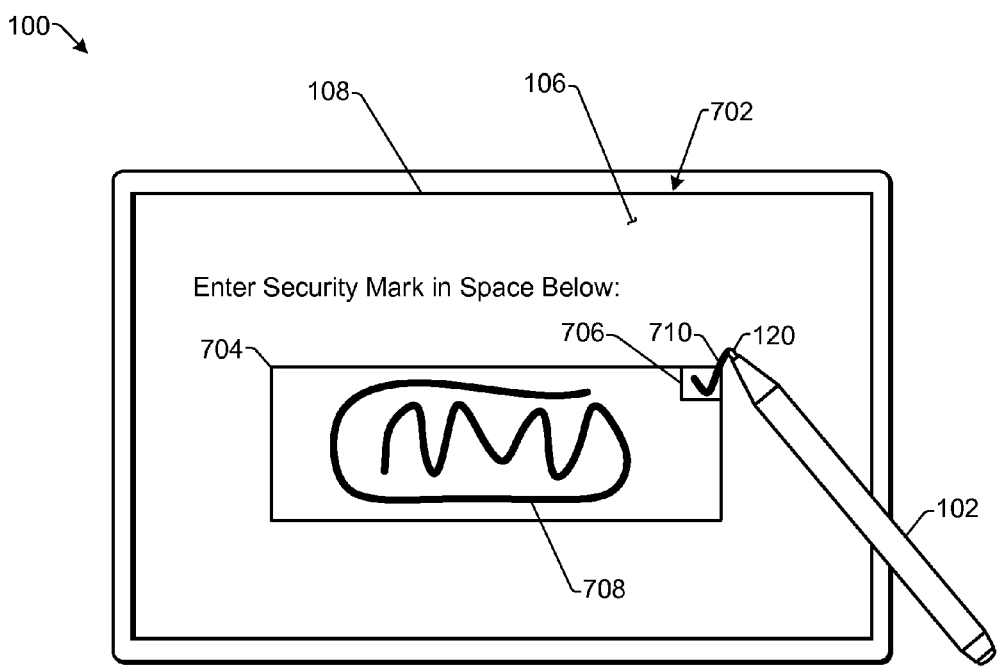
FIG. 7 illustrates example user interactions with an electronic device using a stylus according to some implementations.

FIG. 7 illustrates example user interactions with an electronic device 100 using a stylus 102 according to some implementations. In this example, the user may use the stylus 102 to enter a security mark in lieu of entering a password, signature, credentials, or the like. For example, the security mark may be a non-alphabetic mark that the user may use for various types of interactions that would otherwise require entry of a password, secure credentials, biometric information, or the like. For example, suppose that the user wishes to sign-in or otherwise access an account. The user interface module 112 may present an interface 702 that includes a larger graphic element 704 for entry of the security mark, and an additional smaller graphic element 706 may be used to indicate completion of the security mark by receipt of a second mark in the vicinity. Accordingly, the user may enter a first mark 708 having a first shape that the user has pre-established as the user's security mark into the larger graphic element 704. The user may subsequently enter a checkmark 710 or other suitably shaped mark into the smaller graphic element 706 to indicate that the security mark 708 has been properly entered into the larger graphic element 704. Upon detecting the second mark 710 overlapping the smaller graphic element 706, the user interface module 112 may compare the entered security mark 708 with the security mark pre-established by the user. If the entered security mark 708 sufficiently matches the pre-established security mark, e.g., within a threshold tolerance level, the user interface module 112 may determine that the user has authorization to access the account. On the other hand, if the security mark 708 does not match within the threshold tolerance the access of the user may be denied and/or the user may be requested to enter additional or alternative credentials.

Figure 8:
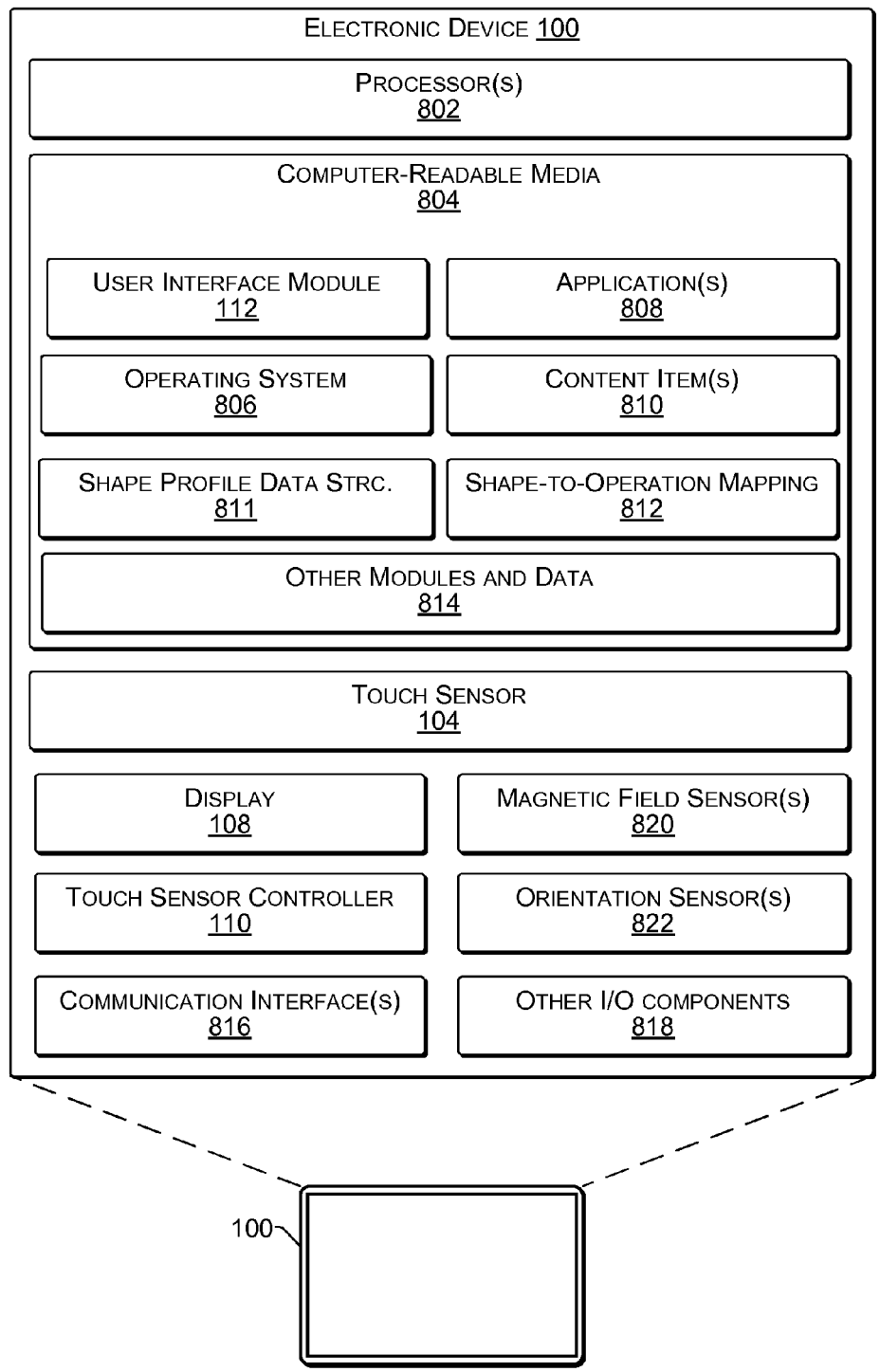
FIG. 8 illustrates select components of an example electronic device according to some implementations.

FIG. 8 illustrates select example components of the electronic device 100 that may implement the functionality described above according to some examples. In a very basic configuration, the electronic device 100 includes or accesses components, such as at least one processor 802 and one or more computer-readable media 804. Each processor 802 may itself comprise one or more processors or processing cores. For example, the processor 802 can be implemented as one or more microprocessors, microcomputers, microcontrollers, digital signal processors, central processing units, state machines, logic circuitries, and/or any devices that manipulate signals based on operational instructions. In some cases, the processor 802 may be one or more hardware processors and/or logic circuits of any suitable type specifically programmed or configured to execute the algorithms and processes described herein. The processor 802 can be configured to fetch and execute computer-readable processor-executable instructions stored in the computer-readable media 804.

Depending on the configuration of the electronic device 100, the computer-readable media 804 may be an example of tangible non-transitory computer-readable media and may include volatile and nonvolatile memory and/or removable and non-removable media implemented in any type of technology for storage of information, such as computer-readable processor-executable instructions, data structures, program modules, or other data. The computer-readable media 804 may include, but is not limited to, RAM, ROM, EEPROM, flash memory or other computer-readable media technology, CD-ROM, digital versatile disks (DVD) or other optical storage, magnetic cassettes, magnetic tape, solid-state storage and/or magnetic disk storage. Further, in some cases, the electronic device 100 may access external storage, such as RAID storage systems, storage arrays, network attached storage, storage area networks, cloud storage, or any other medium that can be used to store information and that can be accessed by the processor 802 directly or through another computing device or network. Accordingly, the computer-readable media 804 may be computer storage media able to store instructions, modules or components that may be executed by the processor 802.

The computer-readable media 804 may be used to store and maintain any number of functional components that are executable by the processor 802. In some implementations, these functional components comprise instructions or programs that are executable by the processor 802 and that, when executed, implement operational logic for performing the actions attributed above to the user interface module 112 and the electronic device 100. Functional components of the electronic device 100 stored in the computer-readable media 804 may include the user interface module 112, as described above, which may be executed on the processor 802 for implementing the detection of touch inputs, such as from the stylus 102. Additional functional components stored in the computer-readable media 804 may include an operating system 806 for controlling and managing various functions of the electronic device 100. Depending on the type of the electronic device 100, the computer-readable media 804 may also optionally include one or more applications 808 and one or more content items 810.

Furthermore, the electronic device 100 may include a shape profile data structure 811, which, as discussed above, may be used for recognizing a shape from touch sensor input information. For example, the electronic device 100 may compare input information received by the touch sensor with one or more shape profiles to attempt to match the received input to a recognized shape in the stored shape profiles.

Additionally, the electronic device 100 may include a shape-to-operation mapping 812, which may be used by the user interface module 112 for determining respective operations to perform in response to detecting particular combinations of shapes drawn using the stylus 102. The shape-to-operation mapping 812 may be, or may correspond to, a table or any other suitable data structure that relates a combination of at least two shapes, e.g., a first shape and a second shape, to a particular operation when the first shape and the second shape are received as touch inputs in a particular context. For example, when a first shape such as an "X" is drawn on a graphic element, the first shape may be associated with an operation to move the graphic element to a deleted items container, which may cause the underlying object, such as a data object, application, etc., to be deleted, marked for deletion, or the like, when a second shape is drawn to indicate deletion should commence.

Similarly, when various other shapes are drawn in combination, e.g., a first shape is drawn overlying a graphic element and the second shape is then drawn to indicate, at least partially, an operation to be performed, the operation to be performed for the combination of shapes may be specified by the mapping. For example, when the first shape is a checkmark, and the second shape is a circle, the mapped operation may indicate that the marked graphic element should be moved to a location underneath the tip of the stylus, and continue to move the graphic element as the stylus tip is moved. Similarly, when the first shape is a "C" and the second shape is a circle, the mapped operation may be to move a copy of the graphic element to a location underneath the tip of the stylus, and to continue to move the copy as the tip is moved, while the original graphic element remains in its original position on the display.

Accordingly, the shape-to-operation mapping 812 may be provided to enable the user interface module 112 to quickly determine the operation to apply when a particular combination of shapes is received from a stylus input. One or more shape matching algorithms may be included in the interface module 112 for matching received touch input shapes with predefined shapes in the mapping 812. For example, tolerance thresholds may be established to ensure that drawn shapes are properly matched with the correct operations. Additionally, in some examples, if a shape drawn by a user is not able to be matched to any shape in the mapping 812, a corresponding mark made on the display 108 may be deleted from the display 108 to indicate to the user that the shape should be redrawn so that it can be matched to a predefined shape in the mapping 812, and thereby matched to a particular operation.

In addition, in some examples, a combination of three or more separate shapes may map to a particular type of operation. Furthermore, as noted above, such as with respect to FIGS. 2A-2B, multiple combinations of shapes may be received concurrently. For example, an "X"-mark, a checkmark and a "C"-mark may all be received concurrently, i.e., in sequence, but there may be no mapping in the shape-to-operation mapping for "X" combined with checkmark, "X" combined with "C," or checkmark combined with "C," and therefore no operation might be performed until another shape, such as the circle 128 is received. When the circle 128 is received, the user interface module 112 may map the combination of the X and the circle to a delete operation, the combination of the checkmark and the circle to a move operation, and the combination of the C and the circle to a copy operation. Consequently, the circle shape may be included in multiple different shape-to-operation mapping entries with various different first shapes. Furthermore, certain shapes, such as the X, checkmark and C may be able to be associated with particular graphic elements that underlie an area of the touch surface where these shapes are drawn. On the other hand, some other types of marks may not be associated with underlying graphic elements, regardless of where they are drawn, such as a number, a "W" (e.g., for wish list), or an "S" (e.g., for shopping cart), as discussed above. Further, other types of marks, such as the circle discussed above, may be alternatively used for either designating a graphic element or designating at least in part that an operation is to be performed with respect to a selected graphic element.

Further, the user may be provided an opportunity to specify particular shapes or shape combinations as corresponding to particular operations to enable customize the shapes and the combinations of shapes according to particular user preferences. For example, the user interface module 112 may provide a learning mode in which the user is able to specify particular marks having specific shapes as corresponding to the execution of particular functions with respect to the graphic user interface 112 of the electronic device 100.

Additionally, in some cases, the electronic device 100 may include other modules and data 814. For example, the other modules may include drivers, communication modules, security modules, and the like. Furthermore, the other data may include, touch sensor scan data, magnetic field data, orientation sensor data, and data of other logical, programmatic and physical components, of which those described above are merely examples that are related to the discussion herein.

FIG. 8 further illustrates that the electronic device 100 includes the touch sensor 104 described above, which may enable a user of the electronic device 100 to operate and interact with the electronic device 100 via touch inputs with the stylus 102, finger or other input object. In one implementation, the touch sensor 104 may be placed behind the display 108, such that user input through contact relative to the display 108 may be sensed by the touch sensor 104. In another implementation, the touch sensor 104 may be placed in front of the display 108, or in another part of the electronic device altogether. In some instances, the touch sensor 104 and the display 108 are integral to provide a touch-sensitive touchscreen display that presents a user interface, applications, or content items, and allows users to navigate and interact via touch inputs.

The touch sensor controller 110 may be included in the electronic device 100 for controlling the touch sensor 104. For example, the touch sensor controller 110 may be an integrated circuit or chip including functionality for periodically scanning the touch sensor electrodes and providing the scan data to the user interface module 112. In other examples, the touch sensor controller 110 is not used and the user interface module 112 controls and scans the touch sensor 104.

FIG. 8 further illustrates the display 108, which may be passive, emissive or any other form of display. In one implementation, the display 108 uses electronic paper (ePaper) display technology, which is bi-stable, meaning that it is capable of holding text or other rendered images even when very little or no power is supplied to the display. Some examples of suitable ePaper displays that may be used with the implementations described herein include bi-stable LCDs, micro electromechanical systems, such as interferometric modulator displays, cholesteric, electrophoretic, electrowetting, electrofluidic, photonic ink, and others. In other implementations, or for other types of devices, the display 108 may be an active display such as a liquid crystal display, plasma display, light emitting diode display, organic light emitting diode display, or any other suitable type of display able to present digital content thereon. Accordingly, implementations herein are not limited to any particular display technology or shape.

In some examples, the electronic device 100 may include one or more communication interfaces 816 that may support both wired and wireless connection to various networks, such as cellular networks, radio, WiFi networks, short-range or near-field networks (e.g., Bluetooth®), infrared signals, local area networks, wide area networks, the Internet, and so forth. For example, the communication interface 816 may allow a user of the electronic device 100 to access the World Wide Web, download content items 810 from a content item service, such as a from a website or other online service, and the like. The communication interface 816 may further allow a user to access storage on another device, such as a user's computing device, a network attached storage device, or the like.

In some examples, the electronic device 100 may further be equipped with various other input/output (I/O) components 818. Such I/O components may include various controls (e.g., buttons, a joystick, a keyboard, etc.), speakers, a microphone, a camera, connection ports, and so forth, which may be activated by the user. For example, the operating system 806 of the electronic device 100 may include suitable drivers configured to accept input from a keypad, keyboard, or other controls and devices included as the I/O components 818. For instance, the controls may include page turning buttons, navigational keys, a power on/off button, selection keys, and so on.

In addition, in some examples, the electronic device 100 may include one or more magnetic field sensors 820 such as in the case that the stylus 102 includes a built-in magnet, as discussed above. For example, the magnetic field sensors 820 may be used to detect the presence and/or orientation of the stylus when the stylus is within the proximity of the electronic device 100. For instance, based on a polarity of the magnet maintained in the stylus, the magnetic field sensors 820 may be used to determine whether a writing tip or an eraser end of the stylus is disposed towards the touch surface of the electronic device 100. In other examples, however, depending on the type of stylus used, the magnetic field sensors 820 may not be included in the electronic device 100.

In some examples, the electronic device 100 may further include one or more orientation sensors 822. As mentioned above, the orientation sensors 822 may include sensing devices such as such as accelerometers, gravimeters, gyroscopes, or the like. The orientation sensors 116 may be used for determining an orientation of the electronic device 100, as well as for providing a point of reference for determining an orientation of the stylus 102 with respect to the touch surface 106. Additionally, the electronic device may include various other components that are not shown, examples of which include removable storage, a power source, such as a battery and power control unit, a global positioning system (GPS) device, a PC Card component, and so forth.

Various instructions, methods and techniques described herein may be considered in the general context of computer-executable instructions, such as program modules stored on computer storage media, such as computer-readable media 804, and executed by the processor 802. Generally, program modules include routines, programs, objects, components, data structures, etc., for performing particular tasks or implementing particular abstract data types. These program modules, and the like, may be executed as native code or may be downloaded and executed, such as in a virtual machine or other just-in-time compilation execution environment. Typically, the functionality of the program modules may be combined or distributed as desired in various implementations. An implementation of these modules and techniques may be stored on computer storage media or transmitted across some form of communication media.

Figure 9:
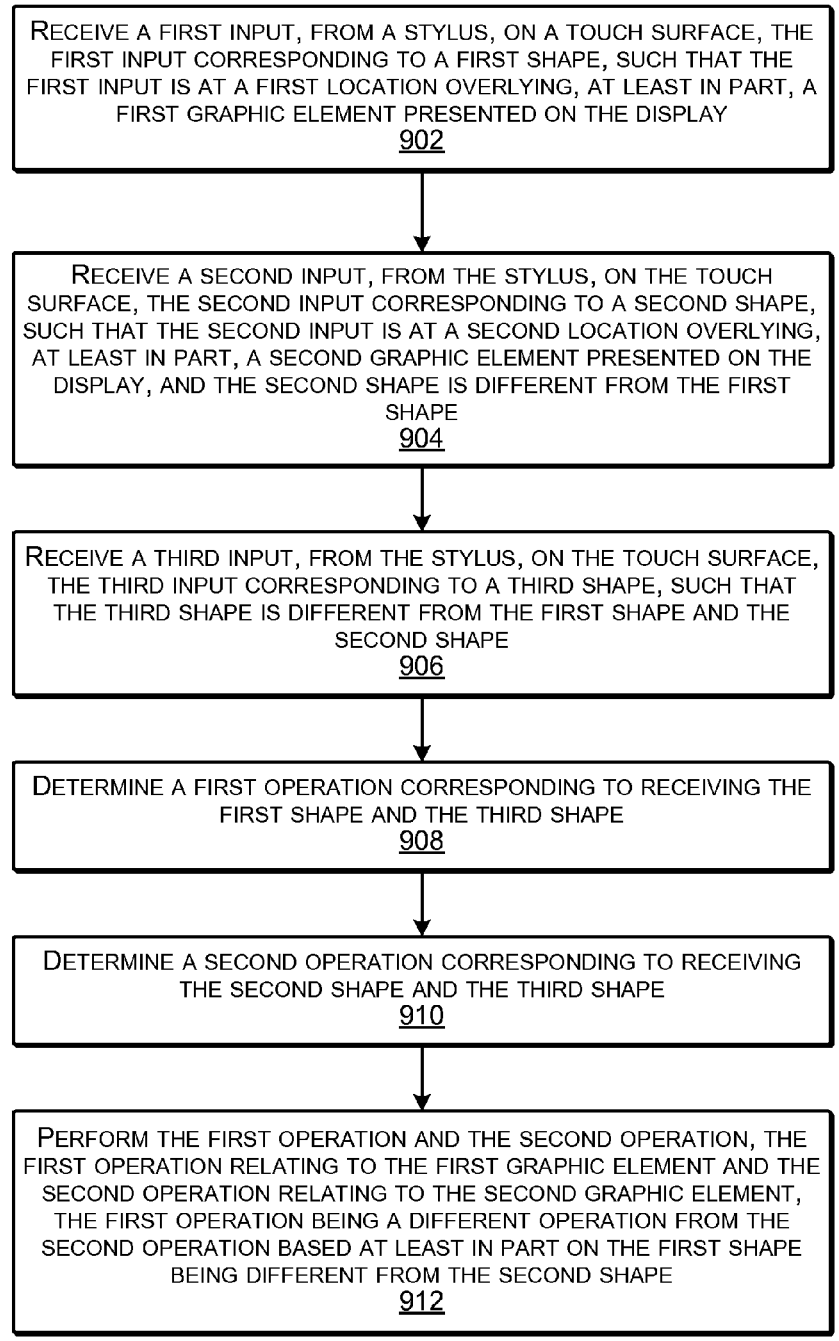
FIG. 9 is a flow diagram illustrating an example process for user interaction with an electronic device using a stylus according to some implementations.
Figure 10:
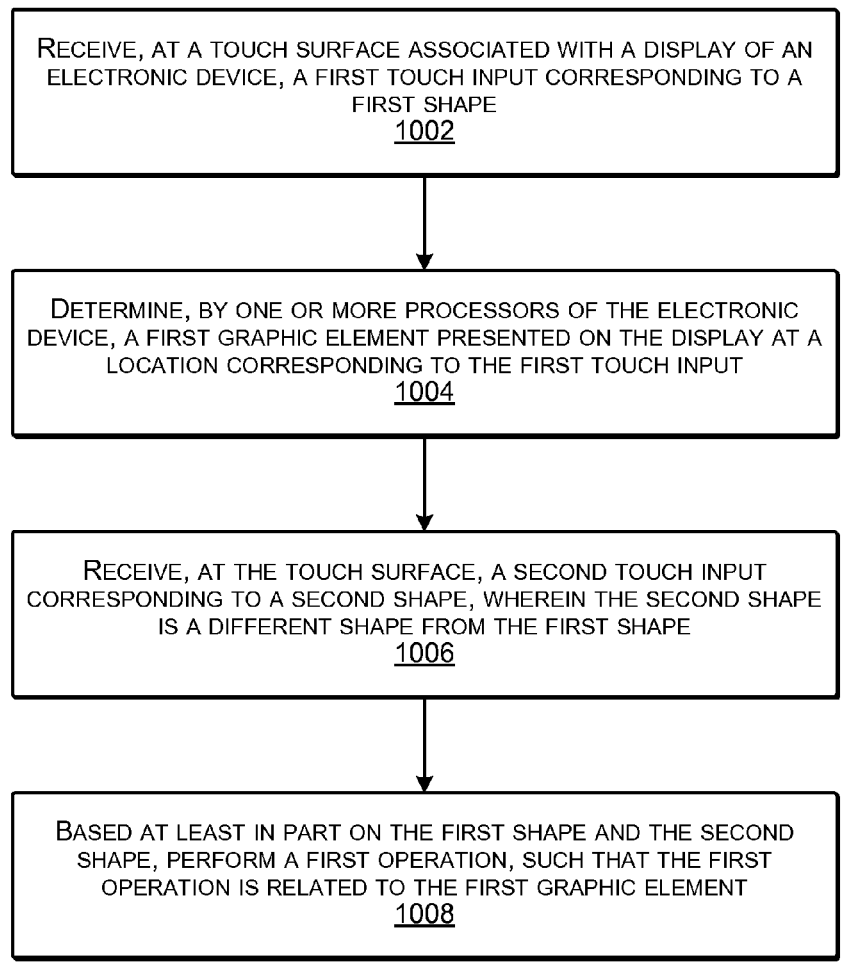
FIG. 10 is a flow diagram illustrating an example process for user interaction with an electronic device using a stylus according to some implementations.
Figure 11:
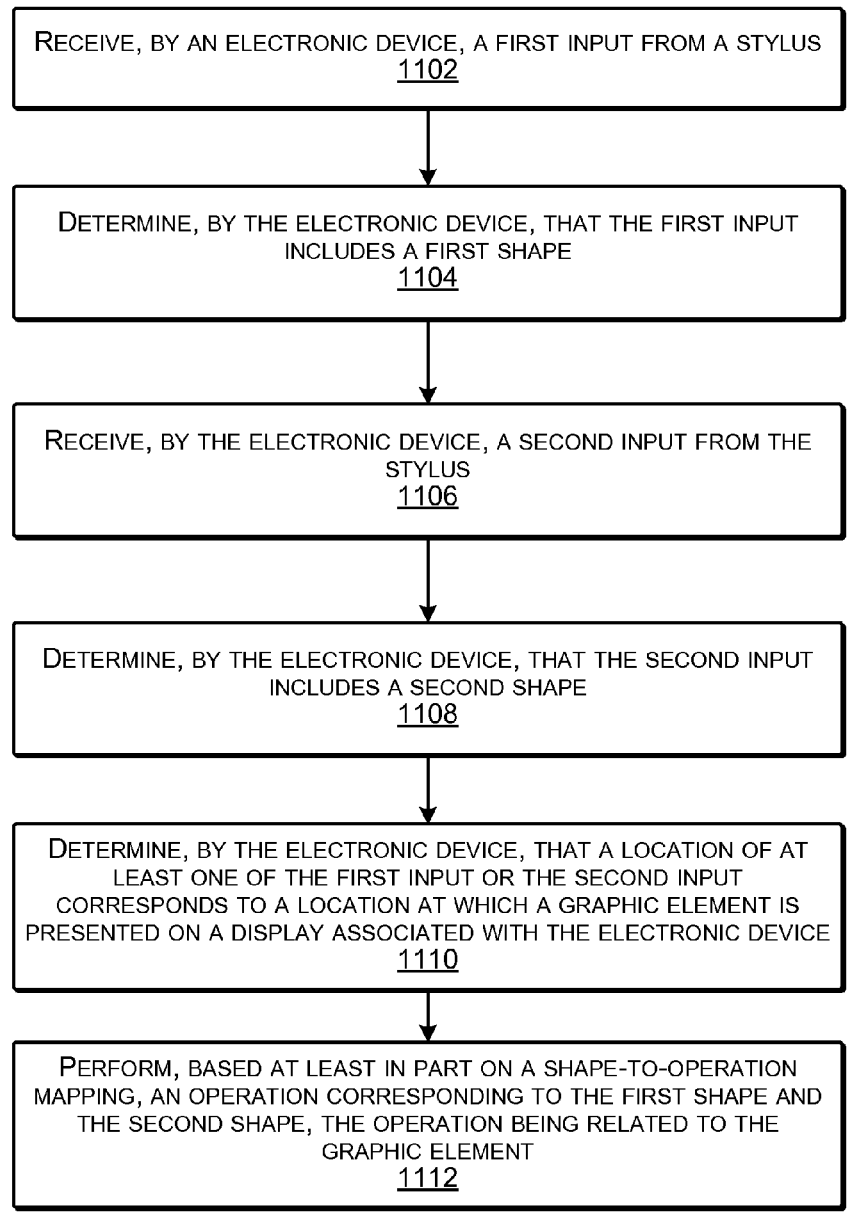
FIG. 11 is a flow diagram illustrating an example process for user interaction with an electronic device using a stylus according to some implementations.

FIGS. 9-11 illustrate example processes for implementing the techniques described above. These processes are illustrated as a collection of operations in logical flow diagrams, which represent a sequence of operations, some or all of which can be implemented in hardware, software or a combination thereof. In the context of software, the blocks represent computer-executable instructions stored on one or more computer-readable media that, when executed by one or more processors, perform the recited operations. Generally, computer-executable instructions include routines, programs, objects, components, data structures and the like that perform particular functions or implement particular abstract data types. The order in which the operations are described should not be construed as a limitation. Any number of the described blocks can be combined in any order and/or in parallel to implement the process, or alternative processes, and not all of the blocks need be executed. For discussion purposes, the processes are described with reference to the devices, architectures and environments described in the examples herein, although the processes may be implemented in a wide variety of other devices, architectures or environments.

FIG. 9 is a flow diagram illustrating an example process 900 that may be executed by the electronic device 100 for enabling user interaction using a stylus according to some implementations herein.

At 902, the electronic device may receive a first input from a stylus on the touch surface, the first touch input corresponding to a first shape. For example, the first input may be at a first location overlying, at least in part, a first graphic element presented on the display. Further, the electronic device may compare information from the first input to one or more shape profiles to determine a first shape corresponding to the first input. For instance, comparing the first input information to the one or more shape profiles many include determining, based on a sequence of scan data from the touch sensor, a shape from the first input information. Additionally, the shape from the first input information may be compared with the one or more shape profiles, and it may then be determined that the shape from the first input information matches a particular one of the shape profiles within at least a threshold amount.

At 904, the electronic device may receive a second input from the stylus on the touch surface, the second input corresponding to a second shape. Further, the electronic device may compare information from the second input to one or more shape profiles to determine a second shape corresponding to the second input in a manner similar to that discussed above. For example, the second input may be at a second location overlying, at least in part, a second graphic element presented on the display, and the second shape may be different from the first shape.

At 906, the electronic device may receive a third input from the stylus on the touch surface, the third input corresponding to a third shape. Further, the electronic device may compare information from the third input to one or more shape profiles to determine a third shape corresponding to the third input in a manner similar to that discussed above. For example, the third shape may be different from the first shape and the second shape.

At 908, the electronic device may determine a first operation to perform in relation to the first graphic element based at least in part on determining the first shape and the third shape. For example, the first operation corresponding to receiving the first shape and the third shape may be determined by accessing a shape-to-operation mapping that indicates the first operation based on the first shape being received in combination with the third shape.

At 910, the electronic device may determine a second operation to perform in relation to the second graphic element based at least in part on determining the second shape and the third shape. For example, the second operation corresponding to receiving the second shape and the third shape may be determined by accessing a shape-to-operation mapping that indicates the second operation based on the second shape being received in combination with the third shape.

At 912, the electronic device may perform the first operation with respect to the first graphic element and perform the second operation with respect to the second graphic element, such that the first operation may be different from the second operation based on the first shape being different from the second shape. For instance, the first operation performed in relation to the first graphic element may include at least one of changing an appearance of the first graphic element; changing a location of the first graphic element; creating a copy of the first graphic element; or deleting the first graphic element. Similarly, the second operation performed in relation to the second graphic element may include at least one of changing an appearance of the second graphic element; changing a location of the second graphic element; creating a copy of the second graphic element; or deleting the second graphic element. Further, the first operation may be different from the second operation based at least in part on the first shape being different from the second shape. As one example, the first operation may be a move operation to move the first graphic element, and the second operation may be one of a copy operation or a delete operation to copy or delete the second graphic element. Additionally, in some cases, the first operation or the second operation may cause at least one the first graphic element or the second graphic element, respectively, to gather at a location underneath a tip of the stylus. Further, in response to detecting movement of the stylus tip, further move the at least one of the first graphic element or the second graphic element in a same direction as the stylus tip. In addition, while several example operations are described herein, numerous other examples will be apparent to those of skill in the art having the benefit of the disclosure herein.

FIG. 10 is a flow diagram illustrating an example process 1000 that may be executed by the electronic device 100 for enabling user interaction using a stylus according to some implementations herein.

At 1002, the electronic device may receive, at a touch surface associated with a display of an electronic device, a first touch input corresponding to a first shape. For example, the electronic device may determine that the first input information corresponds to the first shape by determining, based on scan data from a touch sensor, a shape from the first input information. The electronic device may further compare the shape from the first input information to one or more shape profiles to determine that the shape from the first input information matches the first shape. Further, in some examples, in response to receiving the first touch input, the electronic device may present on the display a first mark corresponding to the first shape. For example, the first mark may be presented on the display at a position corresponding to the first touch input. Additionally, in some cases, receiving the first touch input may include determining that the first touch input is received from a stylus.

At 1004, the electronic device may determine, using one or more processors of the electronic device, a first graphic element presented on the display at a location corresponding to the first touch input.

At 1006, the electronic device may receive, at the touch surface, a second touch input corresponding to a second shape, wherein the second shape is a different shape from the first shape. For example, the electronic device may compare information from the second input to one or more shape profiles to determine a second shape corresponding to the second input in a manner similar to that discussed above. Further, in some examples, in response to receiving the second touch input, the electronic device may present on the display a second mark corresponding to the second shape. For example, the second mark may be presented on the display at a position corresponding to the second touch input. Additionally, in some cases, receiving the second touch input may include determining that the second touch input is received from a stylus.

At 1008, based at least in part on the first shape and the second shape, the electronic device may perform a first operation that is related to the first graphic element. For example, performing the first operation with respect to the first graphic element may include moving the first graphic element to a position on the display determined to correspond to a location of a tip of a stylus. Furthermore, performing the first operation with respect to the first graphic element may include performing a second operation with respect to an object represented by the first graphic element. For instance, the first operation may be representative of the second operation, and the object may be at least one of: a data object; an application; a control of the electronic device; or a feature of the electronic device.

Additionally as an extension, prior to receiving the second touch input, the electronic device may receive a third touch input corresponding to a third shape, and the third shape may be different from the first shape and the second shape. In this case, the electronic device may determine a second graphic element presented on the display that corresponds to a location of the third touch input, and based at least in part on the second shape and the third shape, the electronic device may perform a second operation with respect to the second graphic element that is different from the first operation performed with respect to the first graphic element.

FIG. 11 is a flow diagram illustrating an example process 1100 that may be executed by the electronic device 100 for enabling user interaction using a stylus according to some implementations.

At 1102, the electronic device receives, by a touch sensor, a first touch input from a stylus. For example, a user may user a stylus to draw a first shape on a touch surface of the electronic device.

At 1104, one or more processors of the electronic device determine that the first touch input includes a first shape. Additionally, in some examples, the electronic device may present, on a display associated with the electronic device, at a first location corresponding to the first touch input, a first mark having a shape corresponding to the first shape.

At 1106, the electronic device receives a second touch input from the stylus. For example, a user may user the stylus to draw a second shape on the touch surface of the electronic device.

At 1108, the electronic device determines that the second touch input includes a second shape. Additionally, in some examples, the electronic device may present, on a display associated with the electronic device, at a second location corresponding to the second touch input, a second mark having a shape corresponding to the second shape.

At 1110, the electronic device determines that a location of at least one of the first touch input or the second touch input corresponds to a location at which a graphic element is presented on a display associated with the electronic device. For example, the electronic device may determine that a particular graphic element is presented on the display corresponding to a vicinity of the touch surface at which a particular touch input is received. Accordingly, the electronic device may associate the particular touch input with the particular graphic element.

At 1112, based at least in part on a shape-to-operation mapping, the electronic device performs, with respect to the graphic element, an operation corresponding to the first shape and the second shape. For example, the electronic device may determine that the first shape indicates a control for the electronic device, and may further determine that the second shape indicates an adjustment to the control, such that performing the operation includes adjusting the control based on the second shape. Alternatively, the first shape may be a number, and the second shape may indicates that the number is to be applied to at least one of a control or a graphic element, such that performing the operation includes at least one of adjusting the control based on the number or modifying the graphic element based on the number. Additionally, as another example, the first shape may be a security mark, and the electronic device may compare the first shape with a pre-established security mark. When the first shape matches the pre-established security mark within a threshold level of tolerance, the operation that is performed may include providing verification that the first shape matches the pre-established security mark. Further, as another example, the electronic device may receive a touch input corresponding to a third shape prior to receiving the second shape. For instance, a location of the touch input corresponding to the third shape may be determined to correspond to a different graphic element. Thus, based on receiving the third shape with the second shape, the user interface module may perform a different operation with respect to the different graphic element that is different from the operation performed with respect to the first graphic element.

The example processes described herein are only examples of processes provided for discussion purposes. Numerous other variations will be apparent to those of skill in the art in light of the disclosure herein. Further, while the disclosure herein sets forth several examples of suitable devices, architectures and environments for executing the processes, implementations herein are not limited to the particular examples shown and discussed.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed is:

1. An electronic device comprising:
   a display;
   a touch surface overlying the display;
   one or more processors;
   one or more non-transitory computer-readable media; and
   one or more modules maintained on the one or more non-transitory computer-readable media, which, when executed by the one or more processors, cause the one or more processors to:
   receive first input information via a stylus on the touch surface;
   determine that the first input information is received at a first location overlying, at least in part, a first graphic element presented on the display;
   compare the first input information to one or more shape profiles to determine a first shape corresponding to the first input information;
   receive second input information via the stylus on the touch surface;
   determine that the second input information is received at a second location overlying, at least in part, a second graphic element presented on the display;
   compare the second input information to the one or more shape profiles to determine a second shape corresponding to the second input information, wherein the second shape is different from the first shape;
   receive third input information via the stylus on the touch surface;
   compare the third input information to the one or more shape profiles to determine a third shape corresponding to the third input information, wherein the third shape is different from the first shape and the second shape;
   determine a first operation to perform in relation to the first graphic element based at least in part on the first shape and the third shape;
   determine a second operation to perform in relation to the second graphic element based at least in part on the second shape and the third shape; and
   perform the first operation and the second operation, the first operation relating to the first graphic element and the second operation relating to the second graphic element, the first operation being a different operation from the second operation based at least in part on the first shape being different from the second shape.

2. The electronic device as recited in claim 1, wherein comparing the first input information to the one or more shape profiles further comprises:
   determining, based on a sequence of scan data from the touch sensor, the first shape from the first input information;
   comparing the first shape from the first input information with the one or more shape profiles; and
   determining that the first shape from the first input information matches a particular one of the one or more shape profiles within at least a threshold amount.

3. The electronic device as recited in claim 1, wherein the one or more modules further cause the one or more processors to:
   determine a first position of the stylus with respect to the touch surface;
   present, on the display, at least one of the first graphic element or the second graphic element at a second location based at least in part on the first position of the stylus; and
   in response to detecting movement of the stylus to a second position relative to the touch surface, present on the display the at least one of the first graphic element or the second graphic element at a third location based at least in part on the second position of the stylus.

4. The electronic device as recited in claim 3, wherein the one or more modules further cause the one or more processors to detect at least one of the first position of the stylus or the second position of the stylus while the stylus is within a threshold distance away from the touch surface.

5. The electronic device as recited in claim 1, wherein the one or more modules further cause the one or more processors to:
receive fourth input information via the stylus on the touch surface, the fourth input information being received at a third location overlying, at least in part, a third graphic element presented on the display;
compare the fourth input information to the one or more shape profiles to determine a fourth shape corresponding to the fourth input information, wherein the fourth shape is different from the first shape, the second shape, and the third shape;
determine a third operation to perform in relation to the third graphic element based at least in part on the fourth shape and the third shape; and
perform the third operation relating to the third graphic element, the third operation being a different operation from the first operation and the second operation based at least in part on the fourth shape being different from the first shape and the second shape.

6. A method comprising:
receiving, at a touch surface associated with a display of an electronic device, first input information;
determining, by the electronic device, that the first input information corresponds to a first shape;
determining, by the electronic device, a first graphic element presented on the display at a first location corresponding to the first input information;
receiving, at the touch surface, second input information corresponding to a second shape, wherein the second shape is different from the first shape;
determining, by the electronic device, a second graphic element presented on the display at a second location corresponding to the second input information;
receiving, at a time after the second input information is received, at the touch surface, third input information;
determining, by the electronic device, that the third input information corresponds to a third shape, wherein the third shape is different from the first shape and the second shape;
based at least in part on the first shape and the third shape, performing, by the electronic device, a first operation that is related to the first graphic element; and
based at least in part on the second shape and the third shape, performing, by the electronic device, a second operation that is different from the first operation and that is related to the second graphic element.

7. The method as recited in claim 6, wherein determining that the first input information corresponds to the first shape further comprises:
determining, based on scan data from a touch sensor, the first shape from the first input information; and
comparing the shape from the first input information to one or more shape profiles to determine that the first shape from the first input information matches the first shape.

8. The method as recited in claim 6, wherein:
performing the first operation comprises presenting the first graphic element at a different position on the display; and
performing the second operation comprises deleting the second graphic element from an image currently presented on the display.

9. The method as recited in claim 6, wherein:
performing the first operation comprises presenting the first graphic element at a different position on the display; and
performing the second operation comprises presenting a copy of the second graphic element on the display.

10. The method as recited in claim 6, wherein performing the first operation comprises:
determining a position of a tip of a stylus with respect to the touch surface of the electronic device; and
presenting the first graphic element at a location on the display that corresponds to the position of the tip of the stylus.

11. The method as recited in claim 10, wherein the location on the display that corresponds to the position of the tip of the stylus is different from the first location.

12. The method as recited in claim 6, further comprising determining the position of the tip of the stylus while the stylus is within a threshold distance away from the touch surface.

13. The method as recited in claim 6, wherein performing the first operation comprises performing an additional operation on an object represented by the first graphic element, wherein the object is at least one of:
a data object;
an application;
a control of the electronic device; or
a feature of the electronic device.

14. The method as recited in claim 6, further comprising:
determining that the first shape indicates that the first graphic element is selected; and
determining that the second shape indicates a type of the first operation to be performed with respect to the first graphic element.

15. The method as recited in claim 6, further comprising:
determining that at least one of the first shape or the third shape indicates a number; and
wherein the first operation comprises changing an appearance of the first graphic element on the display based at least in part on the number.

16. A method comprising:
receiving, by an electronic device, a first input from a stylus;
determining, by the electronic device, that the first input includes a first shape;
receiving, by the electronic device, a second input from the stylus;
determining, by the electronic device, that the second input includes a second shape, wherein a first location of the second input corresponds to a first graphic element;
receiving, by the electronic device and at a time after the second input is received, a third input from the stylus;
determining, by the electronic device, that the third input includes a third shape;
determining, by the electronic device, that a second location of at least one of the first input or the third input corresponds to a third location at which a second graphic element is presented on a display associated with the electronic device;
performing, by the electronic device, based at least in part on a shape-to-operation mapping, a first operation corresponding to the first shape and the third shape; and performing, by the electronic device, a second operation with respect to the first graphic element in response to the third input, based at least in part on the second shape being different from the first shape.

17. The method as recited in claim 16, further comprising:
determining that the first shape indicates selection of a control for the electronic device; and
determining that the third shape indicates an adjustment to the control, wherein performing the operation comprises adjusting the control based on the third shape.

18. The method as recited in claim 16, further comprising:
determining that at least one shape of the first shape or the third shape is a number; and
determining that a different shape of the first shape or the third shape indicates that the number is to be applied to at least one of:
  adjusting a setting of a control based on the number; or
  modifying an appearance of the second graphic element based on the number.

19. The method as recited in claim 16, further comprising:
determining that the first shape indicates a selection of the second graphic element; and
determining, based at least in part on the shape-to-operation mapping, that receiving the first shape and the third shape indicates that the operation is at least one of:
  changing an appearance of the second graphic element;
  changing the third location of the second graphic element;
  creating a copy of the second graphic element; or
  deleting the second graphic element.

20. The method as recited in claim 16, further comprising, prior to performing the first operation with respect to the second graphic element, comparing the first shape and the third shape with a plurality of combinations of shapes in the shape-to-operation mapping to determine that the second operation corresponds to receiving the first shape and the third shape.

* * * * *